US009751785B2

(12) United States Patent
Doudrick et al.

(10) Patent No.: US 9,751,785 B2
(45) Date of Patent: Sep. 5, 2017

(54) PHOTOCATALYTIC REDUCTION OF OXO-ANIONS

(71) Applicants: Kyle Doudrick, Tempe, AZ (US); Kiril D. Hristovski, Mesa, AZ (US); Paul K. Westerhoff, Scottsdale, AZ (US)

(72) Inventors: Kyle Doudrick, Tempe, AZ (US); Kiril D. Hristovski, Mesa, AZ (US); Paul K. Westerhoff, Scottsdale, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 576 days.

(21) Appl. No.: 14/509,722

(22) Filed: Oct. 8, 2014

(65) Prior Publication Data

US 2015/0096941 A1    Apr. 9, 2015

Related U.S. Application Data

(60) Provisional application No. 61/888,273, filed on Oct. 8, 2013.

(51) Int. Cl.
*C02F 1/30* (2006.01)
*C02F 1/32* (2006.01)
(Continued)

(52) U.S. Cl.
CPC .............. *C02F 1/70* (2013.01); *C02F 1/008* (2013.01); *C02F 1/30* (2013.01); *C02F 1/32* (2013.01);
(Continued)

(58) Field of Classification Search
CPC .... C02F 1/008; C02F 1/30; C02F 1/32; C02F 1/325; C02F 1/444; C02F 1/70;
(Continued)

(56) References Cited

U.S. PATENT DOCUMENTS 6,372,095 B1 * 4/2002 Noguchi ................... C02F 1/70
204/157.48
2012/0298591 A1 * 11/2012 Sichel ....................... C02F 1/32
210/748.1

OTHER PUBLICATIONS

Anderson, J.A., 2012. Simultaneous photocatalytic degradation of nitrate and oxalic acid over gold promoted titania. Catalysis Today 181 (1), pp. 171-176.
(Continued)

*Primary Examiner* — Lucas Stelling
(74) *Attorney, Agent, or Firm* — Fish & Richardson P.C.

(57) ABSTRACT

A water treatment system including: a flow regulation control system configured to combine oxo-anion-contaminated water with a reduction-promoting agent, a hole scavenger, or both; a reactor fluidically coupled to the flow regulation control system; a first set of system control probes configured to monitor the concentration of oxygen and oxo-anion in the contaminated water; a second set of system control probes configured to monitor concentration of the oxo-anion and reduction products of the oxo-anion in treated effluent from the reactor; and a controller configured to control the flow regulation control system, thereby controlling the flow rate of the contaminated water and the at least one of the reduction-promoting agent and the hole scavenger to the reactor based at least in part on the concentration of oxo-anion and the reduction products of the oxo-anion in the treated effluent.

25 Claims, 11 Drawing Sheets

(51) Int. Cl.
  *C02F 1/44*     (2006.01)
  *C02F 1/70*     (2006.01)
  *C02F 1/00*     (2006.01)
  *C02F 101/16*    (2006.01)
  *C02F 101/22*    (2006.01)

(52) U.S. Cl.
  CPC ........ *C02F 1/444* (2013.01); *C02F 2101/163* (2013.01); *C02F 2101/22* (2013.01); *C02F 2209/003* (2013.01); *C02F 2209/005* (2013.01); *C02F 2209/02* (2013.01); *C02F 2209/06* (2013.01); *C02F 2209/15* (2013.01); *C02F 2209/22* (2013.01); *C02F 2209/40* (2013.01); *C02F 2305/10* (2013.01); *Y02W 10/37* (2015.05)

(58) Field of Classification Search
  CPC ............ C02F 2101/163; C02F 2101/22; C02F 2209/00; C02F 2209/001; C02F 2209/003; C02F 2209/005; C02F 2209/006; C02F 2209/02; C02F 2209/06; C02F 2209/15; C02F 2209/18; C02F 2209/19; C02F 2209/22; C02F 2209/40; C02F 2305/10; Y02W 10/37
  See application file for complete search history.

(56) References Cited

OTHER PUBLICATIONS

Bae, B.U., et al., 2002. Improved brine recycling during nitrate removal using ion exchange. Water Research 36 (13), pp. 3330-3340.
Burow, K.R., et al., 2010. Nitrate in groundwater of the United States, 1991-2003. Environmental Science & Technology 44 (13), pp. 4988-4997.
Cang, Y., et al., 2004. Development of cultures capable of reducing perchlorate and nitrate in high salt solutions. Water Research 38 (14-15), pp. 3322-3330.
Chaplin, B.P., et al., 2006. Effects of natural water ions and humic acid on catalytic nitrate reduction kinetics using an alumina supported Pd—Cu catalyst. Environmental Science & Technology 40 (9), pp. 3075-3081.
Clifford, D., et al., Apr. 1993. Ion-exchange for nitrate removal. Journal American Water Works Association 85 (4), pp. 135-143.
Dortsiou, M., et al., 2009. Electrochemical removal of nitrate from the spent regenerant solution of the ion exchange. Desalination 248 (1-3), pp. 923-930.
Doudrick, K., et al., Aug. 2012. Nitrate reduction in water using commercial titanium dioxide photocatalysts (P25, P90, and Hombikat UV100). ASCE Journal of Environmental Engineering 138 (8), pp. 852-861.
Doudrick K., et al., 2013. Photocatalytic nitrate reduction in water: Managing the hole scavenger and reaction by-product selectivity. Journal of Applied Catalysis B: environmental 136-137, pp. 40-47.
French, R.A., et al., 2009 Influence of ionic strength, pH, and cation valence on aggregation kinetics of titanium dioxide nanoparticles. Environmental Science & Technology 43 (5), pp. 1354-1359.
Gao, W., et al., 2004. Titania-supported bimetallic catalysts for photocatalytic reduction of nitrate. Catalysis Today 90 (3-4), pp. 331-336.
Gao, B., et al., 2006. Great enhancement of photocatalytic activity of nitrogen-doped titania by coupling with tungsten oxide. Journal of Physical Chemistry B 110 (29), pp. 14391-14397.
Gasparovicova, D., et al., 2000. Catalytic reduction of nitrates in drinking water over Pd—Cu catalysts. Chemicke Listy 94 (5), pp. 308-313.
Hirayama, J., et al., 2012. Highly effective photocatalytic system comprising semiconductor photocatalyst and supported bimetallic non-photocatalyst for selective reduction of nitrate to nitrogen in water. Catalysis Communications 20, pp. 99-102.
Hoffmann, M.R., et al., 1995. Environmental applications of semiconductor photocatalysis. Chemical Reviews 95 (1), pp. 69-96.
Inam Ui, H., et al., 2010. Electrochemical reduction of nitrate: a review. Journal of the Chemical Society of Pakistan 32 (3), pp. 396-418.
Karanasios, K.A., et al., 2010. Hydrogenotrophic denitrification of potable water: a review. Journal of Hazardous Materials 180 (1-3), pp. 20-37.
Kominami, H., et al., 2001. Effective photocatalytic reduction of nitrate to ammonia in an aqueous suspension of metal-loaded titanium (IV) oxide particles in the presence of oxalic acid. Catalysis Letters 76 (1-2), 31-34.
Kominami, H., et al., 2005. Selective photocatalytic reduction of nitrate to nitrogen molecules in an aqueous suspension of metal-loaded titanium (IV) oxide particles. Chemical Communications 23, pp. 2933-2935.
Kormann, C., et al., 1991. Photolysis of chloroform and other organic-molecules in aqueous $TiO_2$ suspensions. Environmental Science & Technology 25 (3), pp. 494-500.
Kudo, A., et al., 1987. Photocatalytic reduction of $NO_3-$ to form $NH_3$ over $Pt-TiO_2$. Chemistry Letters 16, pp. 1019-1022.
Lehman, S.G., et al., 2008. Perchlorate and nitrate treatment by ion exchange integrated with biological brine treatment. Water Research 42 (4-5), pp. 969-976.
Li, M. et al., . 2009 Simultaneous reduction of nitrate and oxidation of by-products using electrochemical method. Journal of Hazardous Materials 171 (1-3), pp. 724-730.
Li, L. et al., . 2010 Photocatalytic nitrate reduction over Pt—Cu/$TiO_2$ catalysts with benzene as hole scavenger. Journal of Photochemistry and Photobiology A—Chemistry 212 (2-3), pp. 113-121.
McAdam, E.J., et al., 2006. A review of membrane bioreactor potential for nitrate removal from drinking water. Desalination 196 (1-3), pp. 135-148.
McAdam, E.J., et al., 2008. Biological treatment of ion-exchange brine regenerant for re-use: a review. Separation and Purification Technology 62 (2), pp. 264-272.
McAdam, E.J., et al., 2010. Fate and impact of organics in an immersed membrane bioreactor applied to brine denitrification and ion exchange regeneration. Water Research 44 (1), pp. 69-76.
Mirvish, S.S., Jun. 1985. Gastric-cancer and salivary nitrate and nitrite. Nature 315 (6019), pp. 461-462.
Mori, T., et al., 1999. Reductive decomposition of nitrate ion to nitrogen in water on a unique hollandite photocatalyst. Applied Catalysis B-Environmental 23 (4), pp. 283-289.
Mukherjee, B., et al., 2010. Aggregation and charge behavior of metallic and nonmetallic nanoparticles in the presence of competing similarly-charged inorganic ions. Environmental Science & Technology 44 (9), pp. 3332-3338.
Paidar, M., et al., Nov.-Dec. 2004. A combination of ion exchange and electrochemical reduction for nitrate removal from drinking water part II: electrochemical treatment of a spent regenerant solution. Water Environment Research 76 (7), pp. 2691-2698.
Petriconi, G.L., et al., 1969. Effect of chloride concentration on the decomposition of aqueous sodium nitrate by sunlight. Pure and Applied Geophysics 72 (1), pp. 299-306.
Pintar, A., et a., 2004. Palladium-copper and palladium-tin catalysts in the liquid phase nitrate hydrogenation in a batch-recycle reactor. Applied Catalysis B—Environmental 52 (1), pp. 49-60.
Ranjit, K.T., et al., 1997. Photocatalytic reduction of nitrite and nitrate ions to ammonia on $M/TiO_2$ catalysts. Journal of Photochemistry and Photobiology A—Chemistry 108 (1), pp. 73-78.
Rengaraj, S., et al., 2007. Enhanced photocatalytic reduction reaction over $Bi^{3+}$—$TiO_2$ nanoparticles in presence of formic acid as a hole scavenger. Chemosphere 66 (5), pp. 930-938.
Rothenberger, G., et al., 1985. Charge carrier trapping and recombination dynamics in small semiconductor particles. Journal of the American Chemical Society 107 (26), pp. 8054-8059.
Sa, J., et al., 2009. Photocatalytic nitrate reduction over metal modified $TiO_2$. Applied Catalysis B—Environmental 85 (3-4), pp. 192-200.

(56) References Cited

OTHER PUBLICATIONS

Serpone, N., et al., 1995. Subnanosecond relaxation dynamics in TiO2 colloidal sols (Particle sizes R(P)=1.0-13.4 Nm)—relevance to heterogeneous photocatalysis. Journal of Physical Chemistry 99 (45), pp. 16655-16661.

Shih, Y.H., Liu, et al., 2012. Aggregation of stabilized TiO2 nanoparticle suspensions in the presence of inorganic ions. Environmental Toxicology and Chemistry 31 (8), pp. 1693-1698.

Singh, B., et al., 1979. Nitrate pollution of groundwater from farm use of nitrogen fertilizers—review. Agriculture and Environment 4 (3), pp. 207-225.

Soares, M.I.M., 2000. Biological denitrification of groundwater. Water Air and Soil Pollution 123 (1-4), pp. 183-193.

Strebel, O., et al., 1989. Nitrate pollution of groundwater in Western-Europe. Agriculture Ecosystems & Environment 26 (3-4), pp. 189-214.

Van Ginkel, S.W., et al., 2008. Kinetics of nitrate and perchlorate reduction in ion-exchange brine using the membrane biofilm reactor (MBfR). Water Research 42 (15), pp. 4197-4205.

Vanderhoek, J.P., et al., 1988. Combined ion-exchange biological denitrification for nitrate removal from ground-water under different process conditions. Water Research 22 (6), pp. 679-684.

Xiong, Z., Zhao, et al., 2009. Rapid and controlled transformation of nitrate in water and brine by stabilized iron nanoparticles. Journal of Nanoparticle Research 11 (4), pp. 807-819.

Zhang, W.L., et al., 1996. Nitrate pollution of groundwater in northern China. Agriculture Ecosystems & Environment 59 (3), pp. 223-231.

Zhang, F., et al., 2005. High photocatalytic activity and selectivity for nitrogen in nitrate reduction on Ag/TiO2 catalyst with fine silver clusters. Journal of Catalysis 232 (2), pp. 424-431.

\* cited by examiner

PHOTOCATALYTIC REDUCTION OF OXO-ANIONS

CROSS-REFERENCE TO RELATED APPLICATION

This application claims priority to U.S. Application Ser. No. 61/888,273 entitled "PHOTOCATALYTIC REDUCTION OF NITRATE" and filed on Oct. 8, 2013, which is incorporated by reference herein in its entirety.

FIELD OF THE DISCLOSURE

This disclosure is directed to a continuous flow reactor system for introducing real-time corrections to control photocatalytic reduction of oxo-anions such as chromate and nitrate to innocuous products.

BACKGROUND

Oxo-anions such as nitrate and chromate are pollutants that are harmful in drinking water. Nitrate is a prevalent groundwater pollutant, and is regulated in drinking water. Chromium is also a known drinking water contaminant that poses significant human health risks. Both hexavalent and trivalent chromium forms have been linked to adverse health effects. These findings have raised a concern among the general public and spurred a campaign to regulate by decreasing Cr(VI) levels in drinking water.

Nitrate removal from contaminated waters is difficult with conventional water treatment methods because of nitrate's unique chemistry. Among available nitrate removal technologies, ion exchange (IX) is used frequently in drinking water applications because of its effectiveness, low cost, and operational simplicity in producing reliable drinking water. The ion exchange media used for nitrate removal include non-selective resins and nitrate-to-sulfate selective resins (e.g., Purolite A-520E). But the IX process generates large volumes of waste brine containing nitrate, chloride, sulfate, and other oxyanions. Disposal of IX brine has become a costly challenge from economic and environmental standpoints.

Various other technologies aim to convert nitrate into harmless nitrogen gas ($N_2$); these include biological denitrification, catalytic reduction, and electrochemical reduction. Biological denitrification has not been widely adopted for drinking water applications because of its high capital costs, lengthy lead times for biofilm establishment, and post-treatment requirements for the removal of biomass and dissolved organics. Other reduction technologies also have serious disadvantages (e.g., poor selectivity to nitrogen, hydrogen availability, energy intensiveness) that limit their practical applications and will not soon replace IX in drinking water treatment.

Integration of IX with brine denitrification processes is promising because the combination could reduce IX costs for brine disposal and minimize problems associated with each denitrification approach for drinking water treatment. Biological denitrification to remove nitrate from IX brine has been studied. By treating IX brine instead of the drinking water itself, quality concerns, such as bacterial, organic matter, and hazardous by-product contamination caused by bioprocesses, are reduced. However, IX systems are often operated intermittently (i.e., a few times per month to meet peak water demands), which makes inclusion of biological processes challenging. Electrochemical reduction can selectively treat nitrate in high salt solutions, but may produce $Cl_2$, which can damage the structure of IX resins. An attempt to reduce nitrate using zerovalent iron nanoparticles showed that the nitrate removal rate was greatly slowed in 6% NaCl solution, and ammonium was the predominant by-product accounting for 62% of the reduced nitrate. An effective nitrate reduction technology for IX brine treatment would overcome these disadvantages.

Treatment options for Cr(VI) have traditionally fallen into six treatment categories, including coagulation-precipitation-filtration, adsorption to different media, ion exchange, membrane technology, electrodialysis, and biological removal. These technologies are often troubled by disadvantages stemming from challenges associated with cost, scalability, and reliability to achieve low Cr(VI) concentrations. While studies have demonstrated that uniquely synthesized and modified semiconductor UV/VIS photocatalysts are capable of reducing and removing hexavalent chromium from water to acceptable levels, much of the work focuses on laboratory scale conditions and commercially unavailable photocatalysts.

SUMMARY

In a first general aspect, a water treatment system includes: a flow regulation control system configured to combine oxo-anion contaminated water with at least one of a reduction-promoting agent and a hole scavenger; a reactor fluidically coupled to the flow regulation control system; a first set of system control probes positioned upstream of the flow regulation control system and configured to monitor the concentration of oxygen and oxo-anion in the oxo-anion-contaminated water; a second set of system control probes positioned downstream of the reactor and configured to monitor concentration of the oxo-anion and reduction products of the oxo-anion in treated effluent from the reactor; and a controller configured to control the flow regulation control system, thereby controlling the flow rate of the oxo-anion-contaminated water and the at least one of the reduction-promoting agent and the hole scavenger to the reactor based at least in part on the concentration of oxo-anion and the reduction products of the oxo-anion in the treated effluent from the reactor. The reactor includes a photocatalyst, and the oxo-anion-contaminated water is treated in the reactor to yield a treated effluent.

In a second general aspect, removing an oxo-anion from oxo-anion-contaminated water includes: flowing oxo-anion-contaminated water and at least one of a reduction-promoting agent and a hole scavenger into a continuous flow system to yield a mixture; providing the mixture to a reactor; and photocatalytically reducing the oxo-anion in the mixture to yield a treated effluent, wherein the flow rate of the oxo-anion-contaminated water and at least one of the reduction-promoting agent and the hole scavenger is automatically controlled based at least in part on the concentration of oxo-anion and reduction product of the oxo-anion in the treated effluent.

Implementations may include one or more of the following features.

In some implementations, the oxo-anion includes nitrate, chromate, or a combination thereof.

The water treatment system may include a pretreatment unit fluidically coupled to and upstream of the flow regulation control system, wherein the pretreatment unit is configured to remove organic matter from the oxo-anion-contaminated water. The pretreatment unit may be configured to remove silica, phosphate, sulfate, iron, arsenate, calcium, or a combination thereof from the oxo-anion-contaminated water.

In some cases, the second set of system control probes monitors at least one of pH and temperature in the treated effluent from the reactor. In certain cases, the flow regulation control system includes valves, and the valves are controlled by the controller. The controller may control the residence time of the oxo-anion-contaminated water and at least one of the reduction-promoting agent and the hole scavenger in the flow regulation control system.

The reactor may include a light source. The light source may be selected from the group consisting of a UV light source, a visible light source, a xenon lamp, and a mercury lamp. In some cases, the controller controls the intensity of the light source.

In some cases, the photocatalyst is immobilized on a UV/visible light-conducting surface. In certain cases, the photocatalyst is suspended in the oxo-anion-contaminated water in the reactor.

The water treatment system may include a photocatalyst recovery system fluidically coupled to the reactor. The photocatalyst recovery system may include a microfiltration unit or an ultrafiltration unit.

The photocatalyst may include a catalyst that, upon photon excitation, generates electrons and holes with redox potentials capable of reducing the oxo-anion and its products and oxidizing the hole scavenger, respectively. In some cases, the oxo-anion is nitrate, and the photocatalyst catalyzes the reduction of nitrate to nitrogen gas and ammonium ions.

The reduction-promoting agent may react on the photocatalyst to limit recombination of photo-excited electrons. In some cases, the reduction-promoting agent improves the interaction between the oxo-anion, it reduction products, or both with the photocatalyst.

The hole scavenger generally provides an electron with a redox potential sufficient to fill a hole generated in the photocatalyst upon excitation. In some cases, the hole scavenger is formic acid, sodium formate, or a combination thereof.

Removing an oxo-anion from oxo-anion-contaminated water may include homogenizing the mixture and removing oxidants from the mixture before providing the mixture to the reactor. In some cases, the oxo-anion is nitrate, and photocatalytically reducing the nitrate in the nitrate-contaminated water yields nitrogen gas and ammonia. In certain cases, an intensity of light in the reactor during the photocatalytic reduction is automatically controlled based at least in part on the concentration of oxo-anion and its reduction products in the treated effluent.

Advantages of the continuous flow reactor system described herein include ease of on/off operation, reduced or no start-up time, reduced or no potential for bacteria cross-contamination into treated drinking water, reduced or no need for additional disinfection, and the ability and flexibility to match system energy requirements to influent oxo-anion levels.

DETAILED DESCRIPTION

Photocatalytic reduction of oxo-anions over semiconductor materials can be used to remove these anions from solution. Examples of such oxo-anions include chromate and nitrate. In one exemplary process, photocatalytic reduction of nitrate over semiconductor materials can be used to remove nitrate from solution. Titanium dioxide ($TiO_2$) is one example of a suitable semiconductor material used to effect photocatalytic reduction of nitrate. When irradiated with incident light whose energy is larger than that of the band gap of the semiconductor, electrons are excited to the conduction band ($e^-_{cb}$), and positive holes form in the valence band ($h^+_{vb}$). The electrons and holes generated can be utilized for reduction and oxidation, respectively. However, the photogenerated electron hole pairs can recombine within a few nanoseconds. This recombination can be overcome by adding a hole scavenger (i.e., electron donor) to trap the holes, leaving the photogenerated electrons available for nitrate reduction. Suitable hole scavengers include methanol, ethanol, oxalic acid, acetic acid, formic acid (FA), and sodium formate. Among these, formic acid typically exhibits the highest activity.

The overall redox reactions between nitrate and formic acid with photocatalysts under UV irradiation can be expressed as follows:

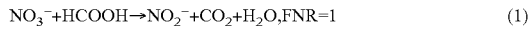
$$NO_3^- + HCOOH \rightarrow NO_2^- + CO_2 + H_2O, FNR=1 \quad (1)$$

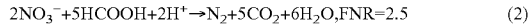
$$2NO_3^- + 5HCOOH + 2H^+ \rightarrow N_2 + 5CO_2 + 6H_2O, FNR=2.5 \quad (2)$$

$$NO_3^- + 4HCOOH + 2H^+ \rightarrow NH_4^+ + 4CO_2 + 3H_2O, FNR=4 \quad (3)$$

Both formic acid (FA) and protons are consumed during nitrate reduction. The theoretical FA to nitrate stoichiometric ratios (FNRs) to reduce nitrate to nitrite, to dinitrogen, and to ammonium are 1, 2.5, and 4, respectively. Though a FNR of 2.5 is an ideal stoichiometric ratio for 100% $N_2$ selectivity, a higher FNR value than 2.5 is usually necessary for effective nitrate reduction. Thus, complete removal of nitrate and FA simultaneously is difficult to achieve. In addition, 100% dinitrogen selectivity is hard to achieve on bare or modified photocatalysts (e.g., $TiO_2$), and ammonium is commonly formed as the aqueous by-product of photocatalytic nitrate reduction Although biologically unstable hole scavengers (e.g., FA) and aqueous nitrogen by-products (e.g., ammonium) are not desirable in drinking water, indirect contact with drinking water through photocatalytic nitrate reduction of spent IX brine is acceptable.

Figure 1:
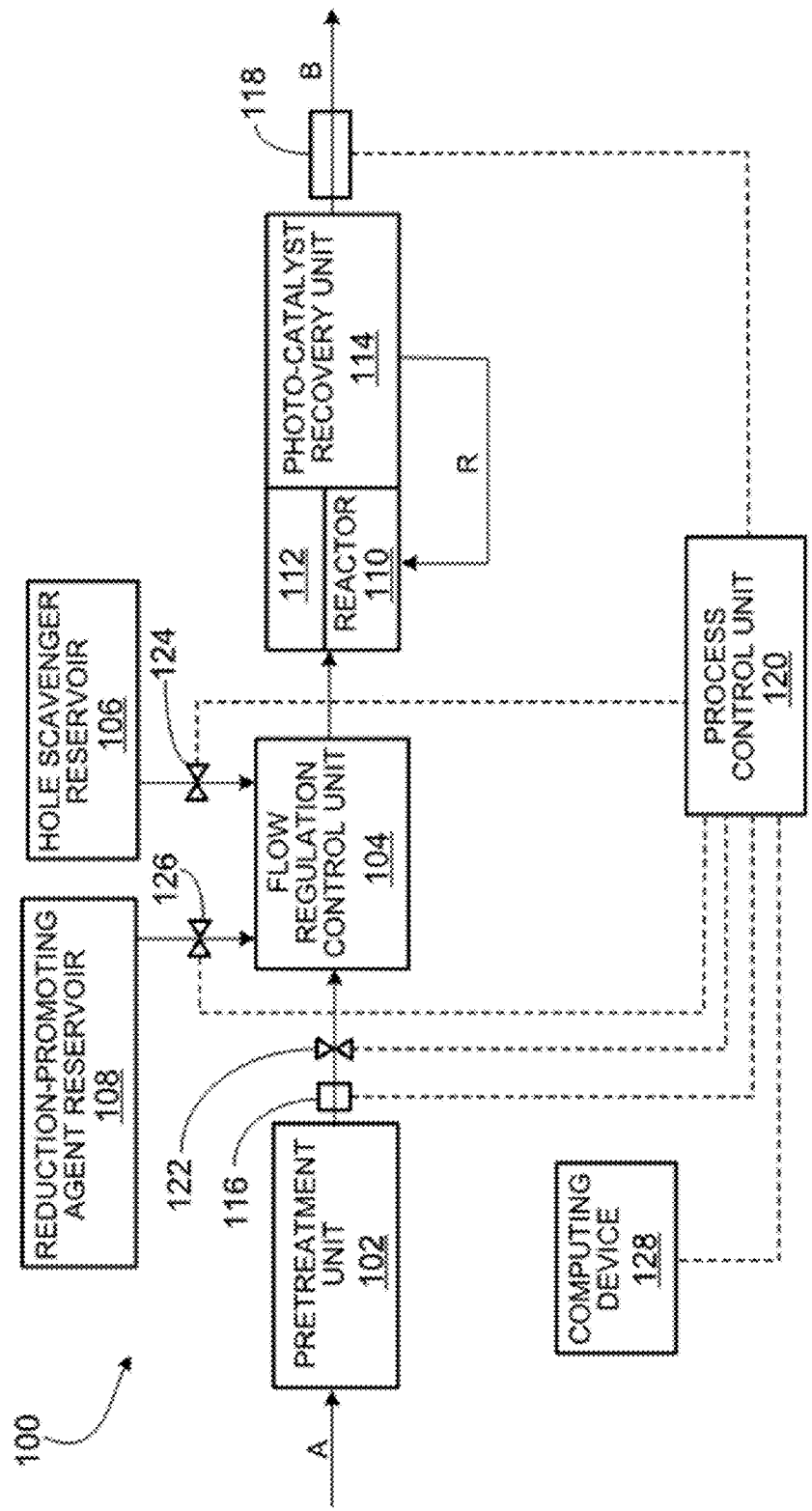
FIG. 1 depicts a continuous flow reactor system for introducing real-time corrections to control photocatalytic reduction of nitrate to innocuous products, such as nitrogen gas.

Automated control of the photocatalytic reduction of nitrate allows for real-time process corrections as well as flexibility for use in a wide range of applications and nitrate-contaminated waters. FIG. 1 depicts a continuous flow reactor system 100 for introducing real-time corrections to control photocatalytic reduction of nitrate to yield innocuous products. A system such as that depicted FIG. 1 is also suitable to remove other oxo-anions, such as chromate, from solution via photocatalytic reduction.

As seen in FIG. 1, nitrate-contaminated water (e.g., groundwater, surface water, brine obtained as a result of nitrate preconcentration with ion exchange technology, or other water) is introduced into optional pretreatment unit 102, as indicated by "A." In pretreatment unit 102, the nitrate-contaminated water is pretreated to remove possible constituents such as natural organic matter, silica, phosphate, arsenate, calcium, and the like, which can potentially interfere with the photocatalytic treatment process. Details of pretreatment unit 102 (e.g., dimensions, hydraulic loading; flow rate) may vary and may depend upon the type of nitrate-contaminated water being processed. Suitable pretreatment units may facilitate water treatment processes such as adsorption using ion exchange, hybrid adsorbents such as metal hydr(oxide)/ion-exchange, and metal (hydr)oxide-activated carbon.

When system 100 includes pretreatment unit 102, the nitrate-contaminated water from the pretreatment unit enters flow regulation control unit 104. When system 100 does not include pretreatment unit 102, nitrate-contaminated water enters the system via flow regulation control unit 104 directly. Flow regulation control unit 104 may regulate one or more of: (i) the amount of "hole scavenger" from hole scavenger reservoir 106 provided to the flow regulation control unit; (ii) the amount of reduction-promoting agent from reduction-promoting agent reservoir 108 provided to the flow regulation control unit; and (iii) the flow rate of nitrate-contaminated water entering reactor 110. The dimensions and specific properties of flow regulation control unit 104 may vary based on specific implementations. In some cases, flow regulation control unit 104 includes a mixing subsystem to provide a residence time suitable to homogenize the hole scavenger with the nitrate-contaminated water and remove interfering oxidants (e.g., sulfate) before the nitrate-contaminated water flows into reactor 110. Reactor 110 includes light source 112 as well a photocatalyst. Light source 112 may include an ultraviolet light source, a visible light source (e.g., xenon or mercury lamp, solar light), or a combination thereof. In some cases, reactor 110 includes a mixing system to promote adequate contact between the photocatalyst, hole scavenger, nitrate anions, and nitrate reduction products. Treated water flows from reactor 110 to photocatalyst recovery unit 114.

Suitable hole scavengers include reagents such as methanol, ethanol, oxalic acid, acetic acid, formic acid, sodium formate, and the like that can provide an electron to the photocatalyst in reactor 110 with a redox potential sufficient to fill the hole generated in the photocatalyst upon excitation. The reduction-promoting agent is a reagent, such as an inert gas or other chemical compound, that is capable of reacting on the photocatalyst in reactor 110 to limit recombination of photo-excited electrons or improving interaction between nitrate, its reduction products, or both with the photocatalyst. The photocatalyst may be any material or combination of materials capable of generating and sustaining electron-hole pairs upon photon-excitation (e.g., semiconductors). Examples of suitable photocatalysts include titanium dioxide, sodium tantalate, tungsten trioxide, iron oxide, and the like. The photocatalyst in reactor 110 may be in suspended form or immobilized onto light conducting surfaces (e.g., ultraviolet-conducting surfaces, visible light-conducting surfaces, or a combination thereof), which can also be fixed (e.g., on quartz glass fibers) or suspended (e.g., on quartz particles). When reactor 110 includes suspended photocatalyst, photocatalyst recovery unit 114 concentrates and separates the photocatalyst from the reaction slurry in the reactor. Photocatalyst recovery unit 114 may include microfiltration or ultrafiltration components for photocatalyst separation. The recovered photocatalyst is returned to reactor 110 via return flow path R.

Data for calculating the appropriate input flow rates of nitrate-contaminated water, reduction-promoting agent, and hole scavenger are fed by two sets of system control probes. The control probes are adapted to measure concentrations of relevant oxo-anions and their reduction products. The exemplary control probes described herein are discussed with respect to nitrate as an oxo-anion.

First system control probe set 116 is positioned upstream of flow regulation control unit 104, and second system control probe set 118 is positioned downstream of photocatalyst recovery unit 114. First and second system control probe sets 116 and 118 are coupled to process control unit 120. First system control probe set 116 includes probes that monitor the concentration of oxygen and nitrate. Second system control probe set 118 includes probes that monitor water quality parameters (e.g., pH, temperature) and concentrations of nitrate, nitrite, and ammonia. Process control unit 120 includes a microprocessor, controller, or the like, and is configured to calculate and control the system input flow rates of nitrate-contaminated water, hole scavenger, and reduction-promoting agent. Desired flow rates are calculated based on the concentration levels of nitrate, nitrite, and ammonia present in the treated effluent that contacts the second system control probe set 118 downstream before exiting as treated water B. The flow rates of nitrate-contaminated water, hole scavenger, and reduction-promoting agent are regulated by digitally controlled valves 122, 124, and 126, respectively, coupled to process control unit 120. In some cases, light source 112 includes a light intensity controller coupled to process control unit 120 and capable of adjusting the intensity of irradiation in reactor 110 based at least in part on data from second system control probe set 118.

In certain embodiments, system 100 communicates with computing device 128 (e.g., a personal computer) to enable viewing, analysis and manipulation of the data output from system (e.g., via process control unit 120). In certain embodiments, computing device 128 is linked to a network that allows remote computing devices to communicate with computing device 128 and in some instances remotely operate system 100. In certain embodiments, computing device 128 can enable a remote party to communicate with an operator to provide the operator instruction on operating system 100.

EXAMPLES

Example 1

Photocatalytic reduction using $TiO_2$ (Evonik P90) was used to remove nitrate from IX. Photocatalytic reduction using P90 was shown to effectively remove nitrate from synthetic NaCl brines and real IX brine. No nitrite was detected as a by-product. Most of the reduced $NO_3$ was converted to volatile nitrogen species and a small portion to ammonium. High levels of chloride slowed the rate of nitrate reduction, but the presence of sulfate in IX brine was the dominating interference factor that inhibited nitrate removal, likely because sulfate competes with nitrate for available surface sites on $TiO_2$ and induces aggregation of $TiO_2$ nanoparticles. A higher IFNR (e.g., 4, 5.6) was found to be more appropriate for nitrate reduction but left higher residual FA in the treated brine. IX column tests showed that 400-mM residual FA in treated brine had an insignificant effect on IX resin capacity loss, and its contamination of treated water could be eliminated by rinsing with 1 BV of fresh NaCl. Sulfate precipitation using barium chloride is one option for mitigating high sulfate concentrations. Because the IX sites are anion specific, residual cations (e.g., $Ba^{2+}$ and $NH_4^+$) in the regenerant solution will not have a negative impact on the removal efficiency. Based upon a $K_{sp}$ of $1.1 \times 10^{-10}$ for $BaSO_4(s)$ and a measured sulfate ion residual of below 50 mg/L, the calculated residual dissolved barium concentration would be on the order of 0.03 mg/L. Although the EPA has set a limit for barium in drinking water at 2 mg/L, the residual concentration remaining in the treated IX brine will have minimal impact on drinking water quality.

While barium sulfate precipitation was utilized, other methods to separate sulfate from ion exchange brines exist (e.g., nanofiltration of the brine). Thus, the photocatalytically treated brine is potentially suitable for continuous reuse after separating the $TiO_2$ nanoparticles. Physical treatment options for nitrate, such as reverse osmosis and ion-exchange, are simple and effective, yet their brine wastes must still be treated. Typically, these nitrate wastes are discharged to the municipal wastewater treatment plant at a specified charge. As shown herein, photocatalysis is a viable alternative for treating these wastes, particularly if improvements are made to the visible-light absorption performance of photocatalysts such that the brine treatment can be done using natural sunlight. Adequately sized photocatalytic systems (e.g., the Photo-Cat system from Purifies) that include photoreactors and ceramic membranes for catalyst recovery are commercially available and could be used to treat sulfate removed brines.

Titanium dioxide (Evonik P90) was obtained in powder form and used as received. P90 is a commercially available product containing both anatase (88%, 12 nm) and rutile (12%, 18 nm) crystal phases; compared with P25 (the most frequently used $TiO_2$), it has a higher surface area and a higher rate of nitrate reduction. P90 loaded with silver (P90/Ag) was synthesized according to methods known in the art. Sodium nitrate ($NaNO_3$, 99% EMD) and FA (HCOOH, 98% Fluka) were used as the nitrate source and hole scavenger, respectively. Sodium hydroxide (NaOH, EMD) was used for pH adjustment. A model water was prepared using a Nanopure® (18.3 MΩ-cm) treatment system. Sodium chloride (NaCl, 99.5% Sigma-Aldrich) was added to model water to create synthetic NaCl brines. A real IX brine was obtained from a nitrate IX system for groundwater treatment. A nitrate selective resin (Purolite A-520E) was used on site to generate the IX brine. The major characteristics of this brine are summarized in

TABLE 1

Characteristics of real IX brine.

| Parameter | Value | Unit | Parameter | Value | Unit |
|---|---|---|---|---|---|
| pH | 7.81 | — | Conductivity | 127.4 | mS |
| Dissolved organic carbon | 23.9 | mg-C/L | Sulfate | 6000 | mg/L |
| | | | Sodium | 4.2% | — |

TABLE 1-continued

Characteristics of real IX brine.

| Parameter | Value | Unit | Parameter | Value | Unit |
|---|---|---|---|---|---|
| Total dissolved nitrogen | 1793 | mg-N/L | chloride Magnesium | 20.6 | mg/L |
| Nitrate | 1740 | mg-N/L | Calcium | 27.2 | mg/L |
| Nitrite | 1.1 | mg-N/L | Total hardness | 350 | mg/L as $CaCO_3$ |
| Ammonium | 3.6 | mg-N/L | | | |

Using an Avantes UV-VIS Fiber Optic Spectrometer (AvaSpec-2048) with a cosine corrector, the lamp intensity was measured in water at multiple points between the bottom and the top of the reactor to obtain the average irradiance. The lamp irradiance starts at approximately 230 nm, and the irradiance absorbable by $TiO_2$ (230-388 nm) was 7.1 mW/cm$^2$, which is used here as the actual energy consumed by P90. Variation of fluence was used instead of accumulation of operating time to make our results comparable to other studies. Because a polychromatic lamp was used, the irradiation is shown as photon fluence (i.e., photons/cm$^2$) instead of energy fluence (e.g., J/cm$^2$) to account for the energy difference at different wavelengths.

Purolite A-520E, a commercially available macroporous strong base anion exchange resin, was used. This resin has quaternary ammonium functional groups and is specifically designed for the removal of nitrate. The resin particles have sizes between 0.3 and 1.2 mm. 50-mL of resin were packed into an IX column (OD=2.5 cm), regenerated using 6% NaCl, and rinsed prior to use. Model water spiked with 200 mg-N/L nitrate was pumped downward at a flow rate of 48 BV/h (40 mL/min), which corresponds to an empty bed contact time of 1.25 min. After nitrate breakthrough, the resins were rinsed and regenerated using 10 BVs of 6% NaCl containing 400-mMFA (the pH was adjusted to 3.0 using sodium hydroxide) at a flow rate of 12 BV/h. In select experiments, an additional regeneration process was followed using 1 BV of 6% NaCl at a flow rate of 6 BV/h.

Concentrations of nitrate, chloride, and sulfate were analyzed using ion chromatography (Dionex DX-120; AS12A column). Nitrite and ammonium in brines could not be analyzed using our ion chromatography setup due to overlapping of chloride and sodium peaks with nitrite and ammonium peaks, respectively. Thus, nitrite and ammonium concentrations were measured using colorimetry (Hach nitrite reagent, TNT plus 839; Hach Ammonium reagent TNT plus 830) on an ultraviolet/visible light absorption spectrometer (Hach DR5000, Loveland, Colo.). Total dissolved nitrogen (TDN) was measured, along with dissolved organic carbon (DOC), using a Shimadzu TOC-V instrument. Samples were acidified and purged with air prior to TDN analysis. TDN measures the sum of non-volatile N-species (e.g., $NO_3^-$, $NO_2^-$, $NH_4^+$, or other aqueous N-species). DOC indicates the concentration of FA added initially as the hole scavenger. X-ray photoelectron spectroscopy (XPS) was performed on an ESCALAB 220i-XL (Vacuum Generators) with a monochromatic Al $K_\alpha$ source at hv=1486 eV and a base pressure=$7 \times 10^{-10}$ mbar. Conductivity and pH were measured using VWR model 2052 and Beckman model PHI 410 m, respectively.

Figure 2A:
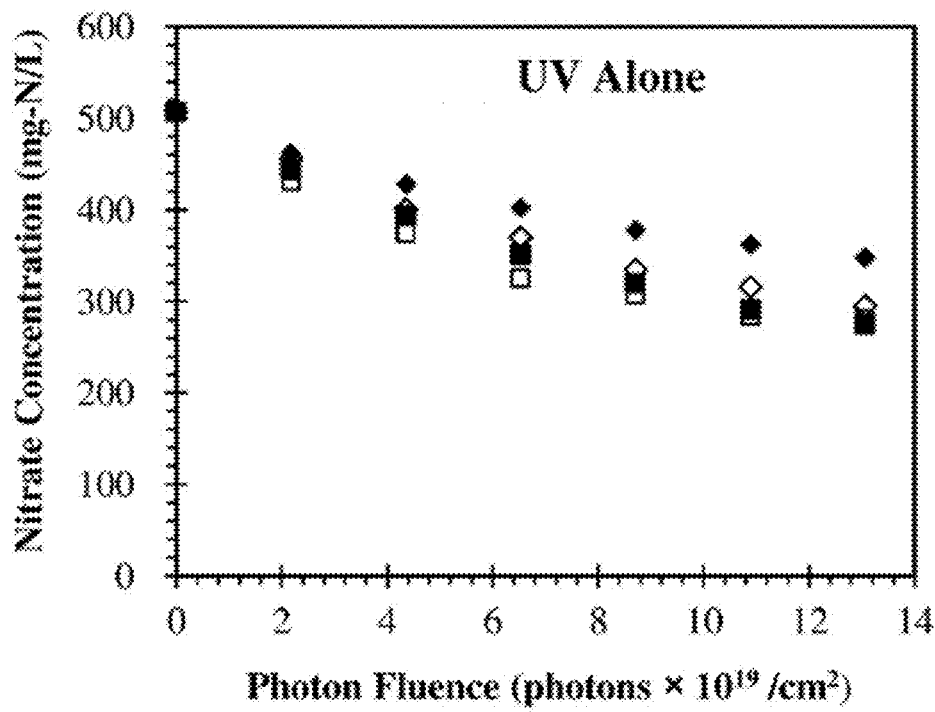
FIGS. 2A and 2B show nitrate removal in synthetic NaCl brines (0%, 3%, 6%, and 10% by weight) as a function of photon fluence absorbable by $TiO_2$ using UV alone and P90+formic acid+UV, respectively. The initial concentration of nitrate was ~500 mg-N/L for all samples. For the FIG. 2B samples, 1-g/L P90 and 200-mM formic acid were initially added to the solution.
Figure 2B:
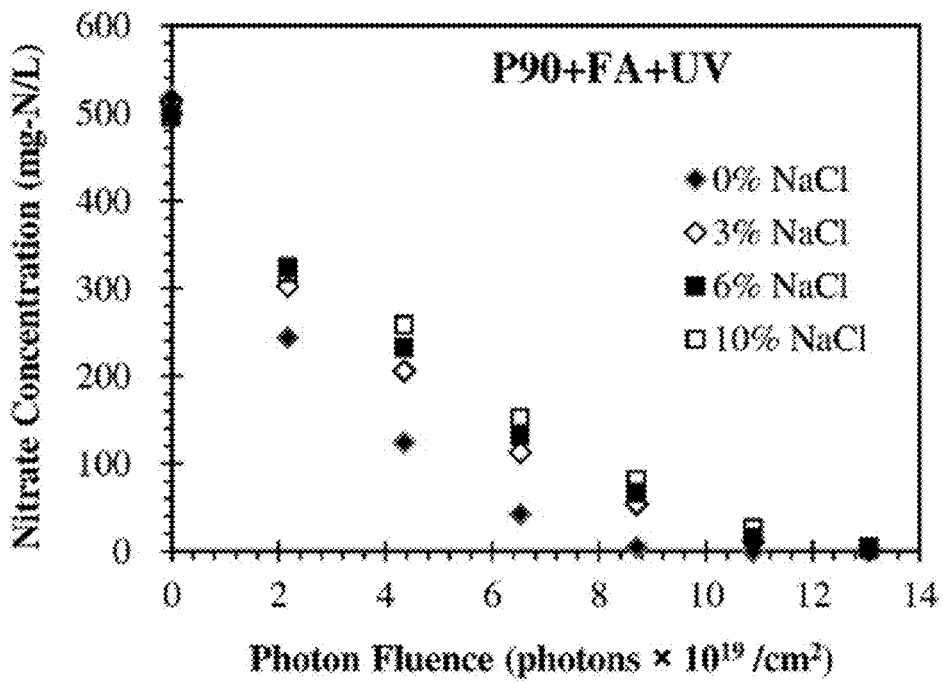

FIGS. 2A and 2B compare the rate of nitrate reduction with UV irradiation only (UV alone) and of photocatalytic reduction using P90 (1 g/L) and FA (200 mM) under irradiation (P90+FA+UV). Nitrate was slowly reduced with UV alone (FIG. 2A), which suggests photolysis of nitrate occurred; nitrite was the major by-product, accounting for more than 90% of the reduced nitrate. Inclusion of P90 and FA substantially increased the rate of nitrate reduction (FIG. 2B). Approximately 25% of the reduced nitrate converted to ammonium and 75% to unknown non-aqueous N species (e.g., $N_2$, $N_2O$). No nitrite concentration was detected throughout the experiment.

In separate experiment in which nitrite (500 mg-N/L) was added initially to model water instead of nitrate, the rate of nitrogen loss in the presence of P90 and FA was significantly enhanced. For example, the first-order rate $k_{nitrite}$ (3.5 cm$^2$/1019 photons) was an order of magnitude higher than $k_{nitrate}$ (0.4 cm$^2$/1019 photons). This could suggest that nitrite may be produced as an intermediate during nitrate reduction but was rapidly reduced and unlikely to be detected in solution. The sum of nitrate, nitrite and ammonium concentrations agreed well with measured TDN levels in all conditions, indicating that levels of other aqueous N species were negligible. In the absence of FA, P90 had a slower nitrate reduction rate than did UV alone, probably because the presence of P90 particles created a light scattering effect that reduced the photon absorption of nitrate. The nitrate removal efficiency of P90+UV was greatly slowed in comparison with that of P90+FA+UV, thus verifying the indispensible role of FA as a hole scavenger in the photocatalytic system.

FIGS. 2A and 2B also reveal the influence of NaCl concentration (0%, 3%, 6%, and 10% by weight) on nitrate removal efficiency. With UV alone, increasing the ionic strength through NaCl addition slightly increased the rate of nitrate removal (FIG. 2A), which may be due to the stabilizing effect of chloride on the photolytic formation of nitrite from nitrate. In contrast, the nitrate removal efficiency decreased as the NaCl concentration increased from 0% to 3% with P90+FA+UV, but additional NaCl addition up to 10% further decreased nitrate removal little (FIG. 2B). The first-order rate constant $k_{nitrate}$ at different NaCl concentrations (0%, 3%, 6%, and 10%) was calculated to be 3.6, 2.4, 2.1, 1.9 cm$^2$/10$^{20}$ photons, respectively. An increase in ionic strength in solution could induce interparticle aggregation by compressing electrostatic double layer (EDL) thickness around nanoparticles. The interference effect brought from the elevating NaCl levels is likely attributed to the aggregation on $TiO_2$ nanoparticles, which decreased the total surface area of P90. Greater than 98% nitrate reduction was achieved at all NaCl levels studied after $1.3 \times 10^{20}$ photons/cm$^2$ irradiation. This suggests that the existence of high levels of chloride slowed the rate of nitrate reduction, but P90 is still capable of effectively reducing nitrate in NaCl brines and is especially competitive in extremely high NaCl concentrations, e.g., 10%. Addition of NaCl did not significantly change the selectivity toward N-species by-products for either UV alone or P90+FA+UV. In an effort to increase the nitrate reduction rate and improve selectivity toward gaseous N species, experiments were conducted using P90/Ag. Titanium dioxide loaded with silver nanoparticles is thought to have much faster kinetics and higher innocuous by-product selectivity in model water. When P90/Ag was tested in a synthetic NaCl brine, however, no better performance was observed in contrast to non-modified P90. This may be due to chloride interacting with the silver and causing it to dissolve. Dissolution of the silver into AgCl might eliminate its ability to enhance the rate of nitrate reduction, thus explaining the similar reduction rates of P90 and P90/Ag.

Figure 3:
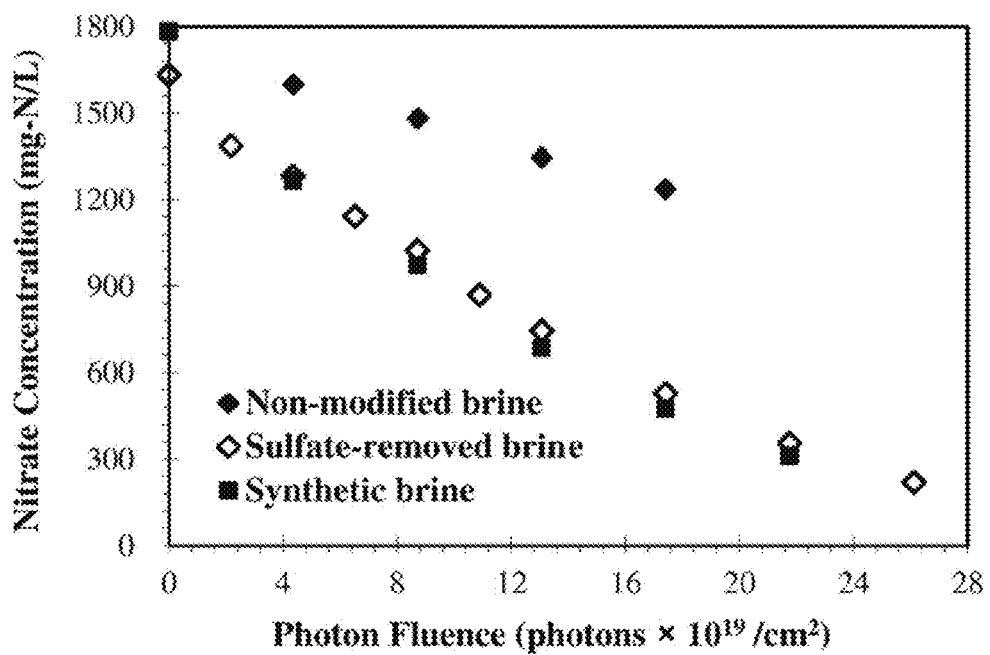
FIG. 3 shows nitrate removal in a non-modified IX brine, synthetic brine (4.2% NaCl solution, 1740 mgN/L nitrate), and sulfate-removed IX brine as a function of photon fluence absorbable by $TiO_2$. The nitrate concentration in the IX brine was 1740 mgN/L. The concentration of P90 in solution was constant at 1 g/L. In all samples, 700 mM formic acid was added initially.

FIG. 3 shows the conversion of nitrate in a non-modified real IX brine in the presence of P90+FA+UV. Nitrate removal was also tested in a synthetic brine (4.2% NaCl solution, 1740 mg-N/L nitrate) for comparison. The difference between the IX brine and synthetic brine suggested a potential role of anions other than chloride in nitrate reduction. Previous studies have shown that the presence of sulfate or carbonate anions decreases the kinetics of photocatalytic nitrate reduction employing $TiO_2$. In this IX brine, carbonate and bicarbonate anions were unlikely to cause interference because they were converted to carbonic acid by the addition of 700-mM FA before irradiation. The sulfate concentration in the IX brine was 6000 mg/L, and its concentration did not decrease during the photocatalytic treatment process.

After removing sulfate from the IX brine through barium sulfate precipitation, the nitrate reduction efficiency was significantly improved (the first order rate constant $k_{nitrate}$ tripled from 2.2 to 6.9 $cm^2/10^{21}$ photons), and the nitrate removals of the sulfate-removed brine and synthetic 4.2% NaCl brine were in good agreement (FIG. 3), which indicates that sulfate is the dominating disturbance factor for nitrate removal in brine. XPS results for P90 after photocatalytic treatment of nonmodified real brine (with sulfate) showed no fouling of the photocatalyst. This indicates that the presence of chloride, sulfate, and other components of the brine did not deactivate the photocatalyst surface and that P90 could be used as a stable photocatalyst for brine treatment.

The impact of different sulfate concentrations (<50, 550, 1000, 6000 mg/L) on nitrate removal was shown by lowering sulfate in brine through precipitation. Nitrate reduction was sensitive to sulfate concentrations. For example, 550 mg/L sulfate (a sulfate-to-nitrate molar ratio of 0.05) was sufficient to decrease the $k_{nitrate}$ by 27.7% in the real brine. The isoelectric point for P90 is approximately 6.4, which suggests that the surface of P90 is positively charged in acidic media (pH<6.4) owing to presence of titanol (Ti—OH) on the surface, and that anions (i.e., $NO_3^-$, $NO_2^-$, and formate) are adsorbed to surface sites of P90 particles before photocatalytic reaction occurs. $SO_4^{2-}$ is divalent and may be preferentially adsorbed by P90 under acidic conditions. Sulfate and chloride compete with nitrate for available surface sites on P90, which slows the rate of nitrate reduction in the brine. In addition, it is thought that the presence of a small concentration of sulfate (e.g., 115 mg/L) can result in huge aggregation of $TiO_2$ nanoparticles, which could further explain the interference effect brought from sulfate in brine. Removal of sulfate from the real brine prior to photocatalysis allowed nitrate to be effectively removed. On average, approximately $3.6 \times 10^{24}$ photons were required to reduce 1 mol of nitrate. No nitrite was detected, and the selectivity of ammonium and gaseous nitrogen compounds was 17% and 83%, respectively. According to DOC measurement, nearly 400-mM FA was left at $2.6 \times 10^{20}$ photons/$cm^2$ of irradiation.

Figure 4A:
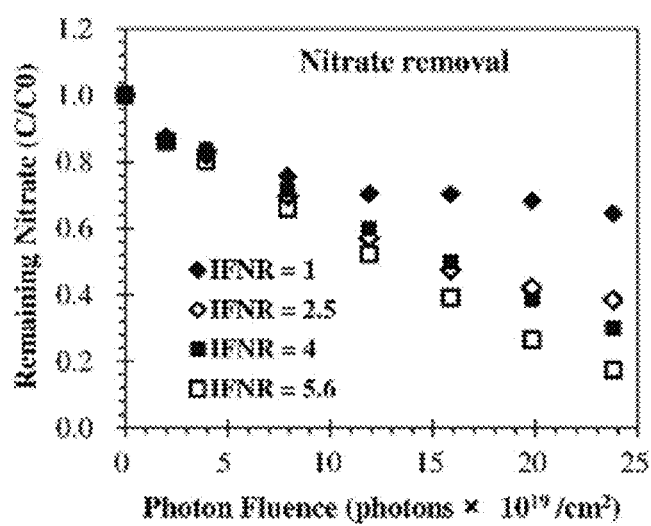
FIGS. 4A and 4B show nitrate removal and formic acid removal, respectively, as a function of photon fluence absorbable by $TiO_2$ in sulfate-removed brine for varying initial formic acid to nitrate molar ratios (IFNRs).
Figure 4B:
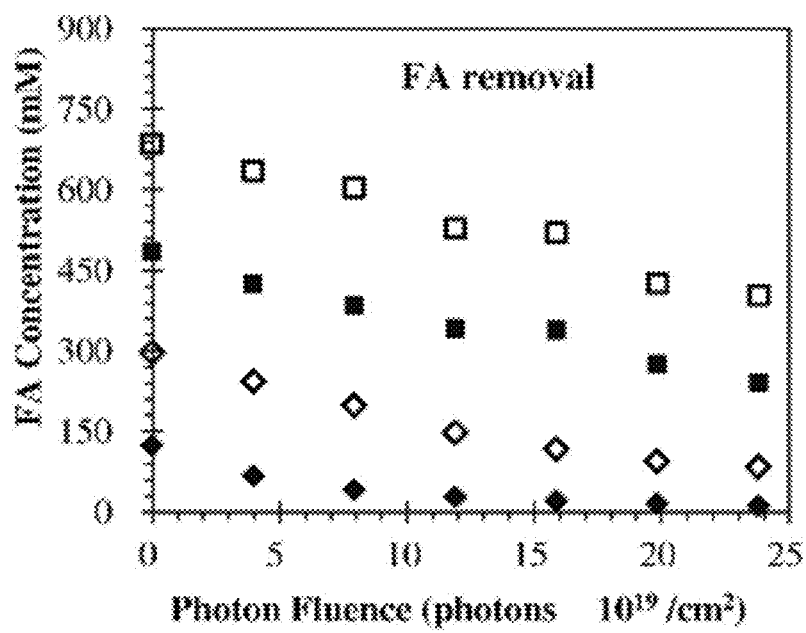

To make optimum use of FA as the hole scavenger and control the residual FA in the treated brine, the initial FA concentration added to the sulfate-removed brine was varied at IFNR=1, 2.5 and 4 other than IFNR of 5.6 (shown above); the results are shown in FIGS. 4A-4C. FIG. 4A compares the nitrate removal efficiency in brine at different IFNR values. The nitrate reduction rate was fastest for IFNR 5.6. For all IFNR values, similar initial nitrate removal rates were observed at less than $7.9 \times 10^{19}$ photons/$cm^2$ of irradiation. However, whereas IFNR 5.6 and IFNR 4 maintained the same nitrate removal rate throughout the experiment, nitrate reduction at IFNR 1 and IFNR 2.5 became much slower after $0.8 \times 10^{20}$ photons/$cm^2$ and $1.6 \times 10^{20}$ photons/$cm^2$ of irradiation, respectively. For IFNR 4 and IFNR 5.6, FNR values increased as nitrate concentration decreased, which suggests sufficient FA was available during the nitrate reduction process. The pH values for IFNR 4 and IFNR 5.6 increased from 2.0 to 3.3 and 1.9 to 3.0, respectively, indicating that adequate protons were available to be consumed. Thus, complete nitrate removal may be achieved with prolonged irradiation. For IFNR 1 and IFNR 2.5, FNR values gradually decreased as the nitrate in the brine decreased. A sharp increase in pH occurred with IFNR 1 (2.6-8.1) and IFNR 2.5 (2.2-7.8), which suggests a deficiency of protons in the solution.

Figure 4C:
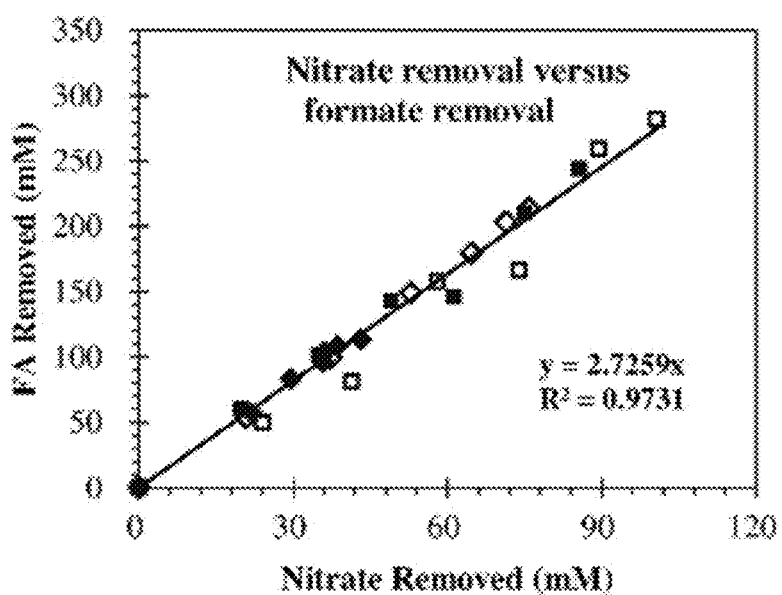
FIG. 4C shows nitrate removal versus formic acid removal. The concentration of P90 in solution was constant at 1 g/L.

As shown in Equations (1)-(3), FA and protons are indispensable factors on photocatalytic nitrate reduction. Lack of FA as a hole scavenger and insufficient protons at neutral pH could explain the slower nitrate reduction rates for IFNR 1 and IFNR 2.5 in the later period (e.g., more than $1.6 \times 10^{20}$ photons/$cm^2$ of irradiation). Moreover, in experiments with sufficient FA and protons (IFNR 4, IFNR 5.6), nitrate was converted into N gases and a small portion of ammonium (~17%) without detection of nitrite. However, in experiments with IFNR 1 and IFNR 2.5, nitrite was formed (>40 mg-N/L); a similar portion of ammonium was produced. The presence of nitrite in treated brine may cause drinking water contamination if the treated brine was reused for IX resin regeneration. Therefore, a higher IFNR value (e.g., 4, 5.6) seems more appropriate for nitrate reduction in IX brine. FIG. 4C reveals the linear relationship between nitrate removal and FA consumed. A FNR of 2.7 (larger than 2.5 as shown in Equation (2)) was found to be constantly consumed because of yielding $NH_4^+$ (following Equation (3)). After $2.4 \times 10^{20}$ photons/$cm^2$ irradiation, 11, 83, 240, 400 mM of FA remained in the treated brine for IFNR=1, 2.5, 4, and 5.6 (FIG. 4B), respectively.

Figure 5:
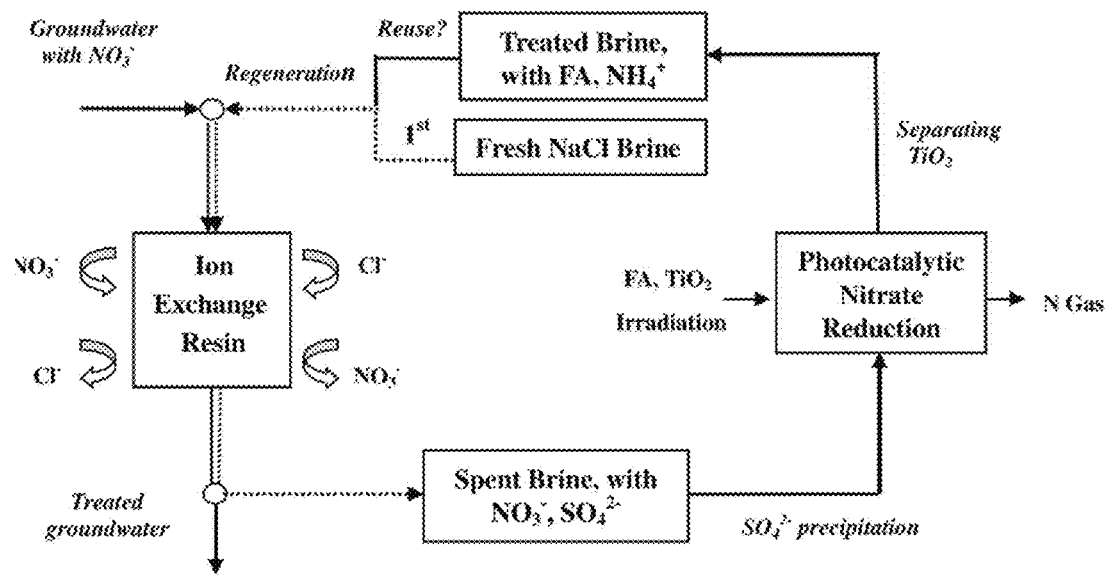
FIG. 5 depicts an ion exchange system integrated with photocatalytic nitrate reduction of IX brine for reuse. FA represents formic acid.

Photocatalytic reduction using P90 can remove nitrate from IX brines with higher IFNRs (e.g., 4, 5.6), with formation of approximately 17% ammonium as the aqueous by-product. As anion exchange resins are used for nitrate removal, accumulation of ammonium is understood to have an insignificant effect on IX resin performance and the treated drinking water quality. Thus, a scheme combining IX with photocatalytic nitrate treatment of IX brine may be able to remove nitrate from drinking water sources (FIG. 5). The subsequent question is what influence the residual FA from photocatalytic denitrification has on IX resin regeneration. Oxidation of all of the FA to $CO_2$ during photolysis may be feasible, but we wanted to investigate the fate of any residual FA by measuring DOC. An IX column was operated to study the impact of residual FA in the brine on IX resin regeneration. The higher residual FA of 400 mM from the IFNR 5.6 experiment was added to synthetic brine (6% NaCl) for IX resin regeneration. To maintain the same formate concentration, the pH of the synthetic brine was adjusted using sodium hydroxide to 3.0, the pH of the treated brine from the IFNR 5.6 experiment.

Figure 6A:
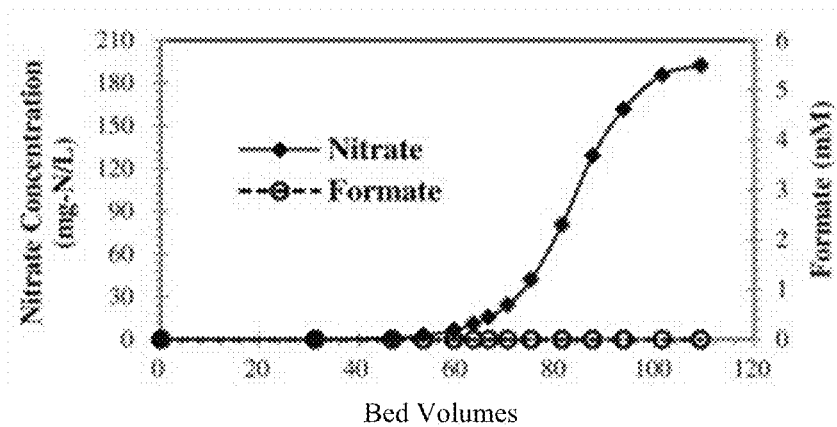
FIG. 6A shows a breakthrough curve of nitrate and formate for fresh IX resin.
Figure 6B:
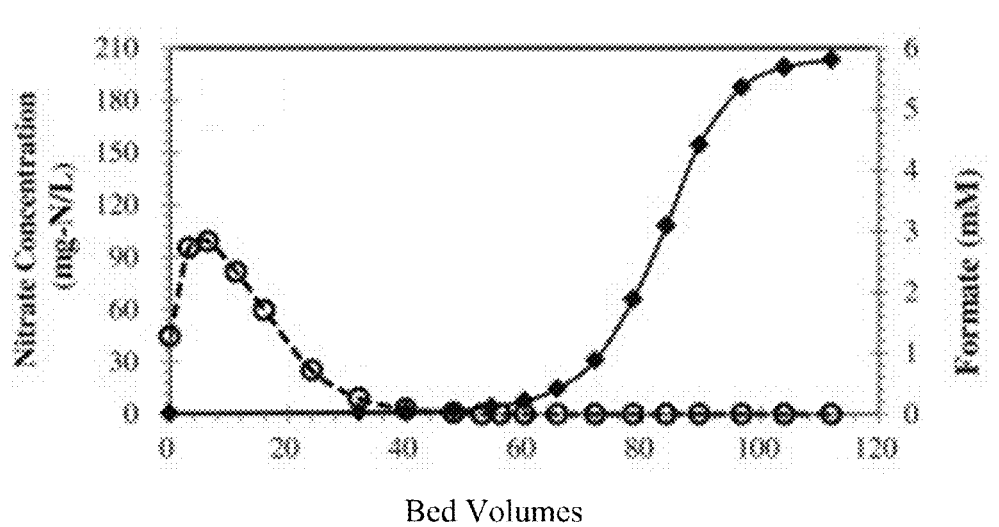
FIGS. 6B and 6C show breakthrough curves of nitrate and formate for regenerated resin. The regenerant used before FIG. 6B was 6% NaCl containing 400-mM FA (500 mL), pH=3.0. The regenerant used before FIG. 6C was 6% NaCl containing 400-mM FA (500 mL), pH=3.0, followed by 50 mL fresh 6% NaCl.
Figure 6C:
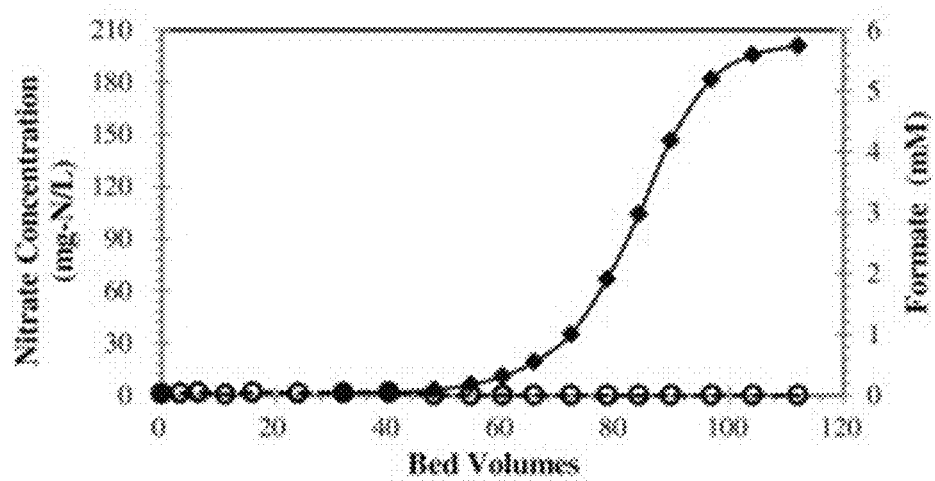

FIGS. 6A-6C show the nitrate and formate breakthrough curves as a function of bed volumes (BVs) of treated water. A high influent nitrate concentration (200 mg-N/L) was used to accelerate IX column tests. Similar nitrate breakthrough curves were observed for fresh resin (FIG. 6A) and regenerated resin (FIGS. 6B and 6C). Using 10 mg-N/L (EPA MCL) as the breakthrough threshold, the amount of nitrate-containing model water can be treated during the processes depicted in FIGS. 6A, 6B, and 6C is 62, 61, and 59 BVs, respectively. The small differences indicate that the residual formate in treated IX brine resulted in minimal loss of the nitrate removal capacity of IX resins. However, after regeneration using FA containing brine, formate was detected in treated water (FIG. 6B) in the first 40 BVs, with a maximum of 2.8 mM (127.5 mg/L) at approximately 6 BVs. It is thought that formate anions in the brine occupied resin exchange sites during the regeneration process and were displaced by nitrate in the model water in the following exhaustion runs, causing treated water contamination. Assuming the impact of FA in treated brine is exchange based, 50 mL (1 BV) of fresh 6% NaCl was applied as a follow-up regeneration process to replace formate brought from regeneration using FA-containing brine. This approach eliminated formate leakage into treated water (FIG. 6C), which further supported the exchange based assumption. As a result, the negative effect of a high concentration of residual FA in IX brine could be overcome, and the reliable performance of the IX process could be ensured. By reusing the photocatalytically treated brine for regeneration, costs for NaCl consumption and brine disposal can thus be reduced.

Example 2

Photocatalytic reduction of hexavalent chromium, Cr(VI), was investigated to remove all chromium species from drinking and industrial waters. Deionized (DI) and tap water experiments were performed using an integrated UV lamp-ceramic membrane system that recirculates $TiO_2$. Hexavalent and total chromium concentrations were simultaneously reduced during treatment. Cr(VI) removal gradually increased with higher energy input and $TiO_2$ dosage, achieving above 90% removal for a 1 g/L dose of $TiO_2$. Cr(VI) was photochemically reduced to Cr(III) on the surface of $TiO_2$, where the Cr persisted as a precipitate. Upon further irradiation, Cr(III) could be reoxidized to Cr(VI). To greater extents in tap water than in DI water, photoaggregation of the catalyst was evidenced by increased particle size and decreased breakthrough of $TiO_2$ upon increased irradiation intensity.

Figure 7:
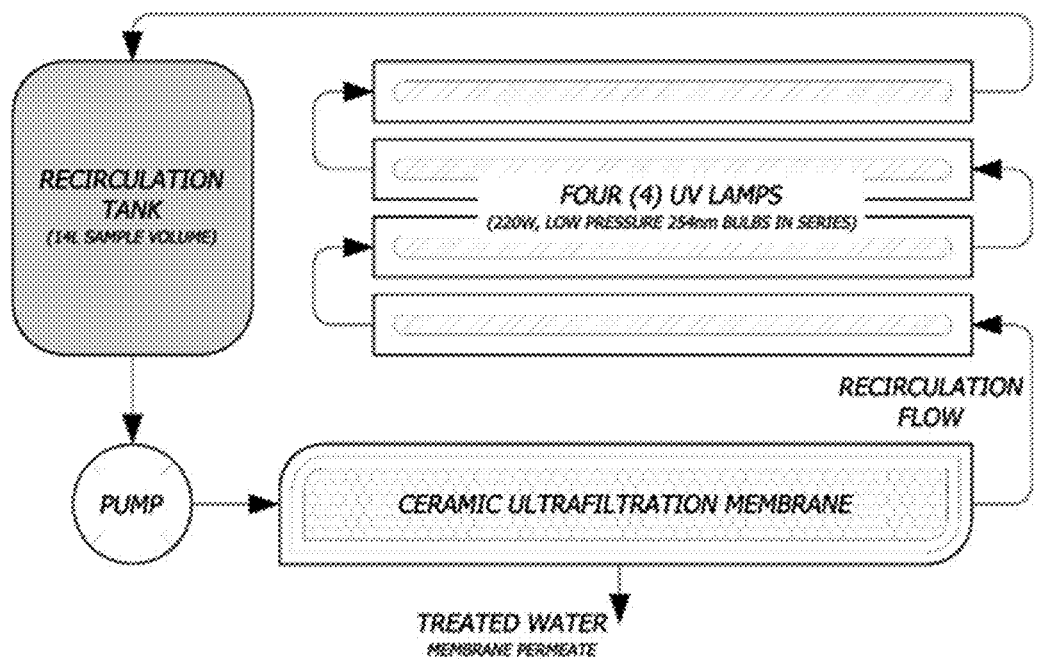
FIG. 7 depicts a pilot-scale photocatalytic reactor, PhotoCat L®, by Purifies.

Photo-Cat® Serial 0700 system (Purifics ES Inc., Ontario, Canada) was selected to investigate the photocatalytic reduction capabilities of such systems for treatment of hexavalent chromium. The Photo-Cat® Serial 0700 system is an integrated UV/ceramic membrane reactor comprised of four 220 W low pressure mercury UV lamps controlled by an automated process control system (FIG. 7). These low pressure lamps emit UV light with $\lambda$=253.7 nm, which is sufficient to activate the $TiO_2$ bandgap 3.2 eV and create hole/electron pairs. Unmodified Evonik P90 $TiO_2$, which is characterized with same crystallinity as P25, but smaller crystal particle size and higher surface area, was used a $TiO_2$ photocatalyst to minimize the electron/hole recombination effect. The system allows for complete recovery and reutilization of the $TiO_2$ photocatalyst by recirculating it through the ceramic ultrafiltration membrane. In addition to the ability to be operated in a recirculation mode only (no active lamps), the Photo-Cat® system allows for variable power output control by operating one or multiple lamps simultaneously.

The initial photocatalysis experiments were conducted in ultrapure water (<1.5 µS/cm) to verify the system's ability to treat chromium and exclude the potential interference of species that could impair the photocatalytic reduction process. An experimental matrix comprised of two initial hexavalent chromium concentrations (100 ppb and 500 ppm) and three $TiO_2$ slurries containing 0.01 g/L, 0.1 g/L and 1.0 g/L P90 was established to examine the hexavalent chromium reduction performance of the system at different contaminant/catalyst ratios. Although these hexavalent chromium concentrations generally exceed values found in natural systems, high concentrations were used to ensure observable concentration changes throughout experiments. Potassium dichromate ($K_2Cr_2O_7$, Sigma Aldrich, >99%) was used as the source of the hexavalent chromium.

The experiments were conducted in the system's recirculation mode at programmed flow rates of 20 L/min and at UV lamp energies ranging from 0 to 8 kWh/m$^3$ with total treatment volume of 14 L. Temperature of the system was maintained at 27.5±2.5° C. by running cooling water across the lamps. Control experiments with no $TiO_2$ were also conducted to assess the photocatalytic reduction capabilities of the system without presence of $TiO_2$. External organic hole scavengers and pH control were not used during these experiments. During the experiments, the pH ranged between 6.5 and 7.1. The system was purged with minimum of 250 L of deionized water between experiments to eliminate crossover contamination. Lamp performance was assessed periodically by conducting methylene-blue photodegradation tests as part of a frequent quality control process. These tests ensured comparable performance for all lamps. Electrical energy per order (EE/O) was calculated for photocatalytic experiments following the method described by Bolton et al. ("Fundamental photochemical approach to the concepts of fluence (UV dose) and electrical energy efficiency in photochemical degradation reactions", *Research on Chemical Intermediates,* 28(7), 857-870).

Sample aliquots with a volume of 40 mL were taken at regular time intervals from the system's effluent port located after the ceramic membrane. The aliquots were additionally filtered through 0.45 µm filters to ensure absence of any $TiO_2$ nanoparticles. Samples were acidified with (1) ultrapure nitric acid for analysis via inductively coupled plasma mass spectrometry (ICP-MS), or (2) with ammonium hydroxide buffer solution for ion chromatography. Modified EPA Method 218.6 was used to determine hexavalent chromium concentrations by ion-chromatography (Dionex ICS 2000) following a manufacturer recommended post-column derivatization method with 1,5-diphenylcarbazide and ammonium sulfate eluent. Total chromium concentrations were measured using a quadrapole inductively coupled plasma mass spectroscopy (ICP-MS; Thermo Fisher Scientific XSeries 2).

To examine the influence of water matrix on contaminant removal and assess the system's performance, water matrices with increasing complexity were used: (1) 5 mM $NaHCO_3$ buffered ultrapure water, (2) deionized water with added potassium hydroxide to adjust pH without adding alkalinity, (3) and a more complex tap water matrix (dechlorinated tap water from the City of Tempe distribution system with Hardness=220 mg/L as $CaCO_3$; TDS=615 mg/L; Conductivity 1.0±0.1 mS/cm). The pH of the 5 mM $NaHCO_3$ buffered ultrapure water was 8.6±0.1, while the pH of the tap water was 7.8±0.1. The pH of the KOH-adjusted solution was varied from 6.5±0.1 to 9.0±0.1. Water samples were prepared by spiking 500 µg Cr/L hexavalent chromium (potassium dichromate, $K_2Cr_2O_7$, Sigma Aldrich, >99%) into the various water matrices with input lamp energies ranging from 0 to 31 kWh/m$^3$. Experimental protocol was identical to that followed for the ultrapure experiments above.

As titanium dioxide photocatalysis is an oxidation-reduction system, the potential for oxidation of photocatalytically reduced trivalent chromium sorbed onto the titanium dioxide surface was quantified to determine potential for re-suspension of hexavalent chromium upon excess illumination. Chromium (III) chloride hexahydrate ($CrCl_3.H_2O$, Sigma-Aldrich, >98%) was used as the source of trivalent chromium, and was spiked into the system to achieve dosages of 100 and 500 μg-Cr/L. Identical protocols were followed to previous photocatalytic experiments at catalyst dosages of 0.1 g/L and 1.0 g/L P90.

Spent $TiO_2$ photocatalyst samples were examined from all three water matrices to determine any photocatalyst poisoning or sorption of chromium onto the P90. The samples were dried at 100° C., placed on an aluminum stub about, and left to equilibrate at room temperature (22° C.) before electron microscopy analysis. A scanning electron microscope equipped with an energy dispersive X-ray microanalysis system (SEM/EDX) (Philips XL30-EDAX) was used to determine presence of chromium on the surface of titanium dioxide photcatalyst.

Samples for aqueous titanium analysis were collected from a sample port on the reactor as the permeate from the ceramic membrane to determine potential for nanoparticle leaching from the reactor. Single particle ICP-MS (spICP-MS), an emerging nanoparticle quantification and size characterization technique (Degueldre et al., "Gold Colloid Analysis by Inductively Coupled Plasma-Mass Spectrometry in a Single Particle Mode", Anal. Chim. Acta. 555(2): 263-268; Mitrano et al., "Silver Nanoparticle Characterization Using Single Particle ICP-MS (SP-ICP-MS) and Asymmetrical Flow Field from Fractionation", ICP-MS (AF4-ICP-MS) 27(7):1131-1142), was used to evaluate the particulate $TiO_2$ equivalents amount in the effluent of photocatalytic reactor. Effluent samples were introduced into the ICP-MS directly and the instrument signal in counts per second (cps) was documented versus time. Dwell time, the unit time interval in which one reading was integrated, was set as 10 ms and the sample flow rate was set as 0.69 ml/min. Nebulizer transport efficiency was determined based on previous research (Pace, et al. 2011) as 1.58% to be used in Ti quantification. Total Ti concentration was evaluated by taking account of the elevated baseline relative to the blank and counting the pulses that stand for the detectable particle signals.

Figure 8:
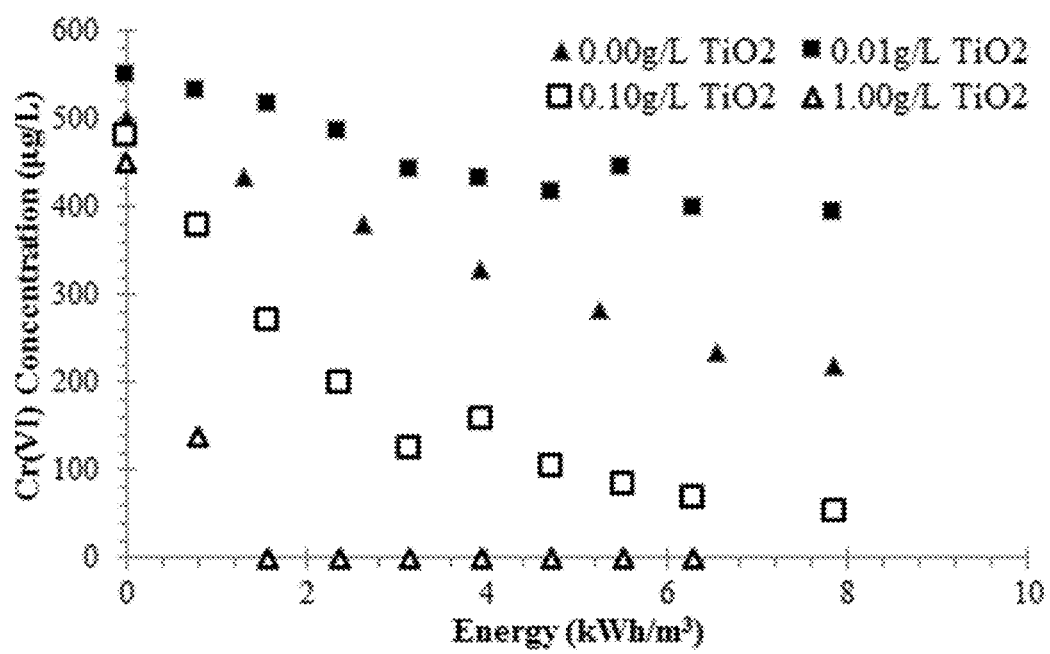
FIG. 8 shows hexavalent chromium removal as a function of four $TiO_2$ catalyst dosages in model water matrix (18.3 MΩ nanopure deionized water) with one of four operational lamps running in recirculation mode. pH ranged from 6.5 to 7.1 (initial to final) and temperature was maintained between 25-30° C.

Cr(VI) concentrations slowly decreased by direct UV photolysis in an ultrapure water, without $TiO_2$ (FIG. 8). A 1 g/L dosage had the fastest rate of Cr(VI) removal, achieving removal to non-detect levels. An unexpected finding was that photolysis (no added $TiO_2$) was more effective at removal than adding a very low dosage of 0.01 g/L. It is likely that the low $TiO_2$ dosages reduced UV transmittance, thus limiting direct photolysis of Cr(VI), while providing minimal surface on the $TiO_2$ for electron transfer to Cr(VI). The highest titanium dioxide dose (1.0 g/L $TiO_2$) had an EE/O value of 0.36 kWh/m$^3$, which is within a cost effective range, while the EE/O for 0.1 g/L $TiO_2$ was found to be an order of magnitude higher (8.3 kWh/m$^3$). Based upon these findings, two $TiO_2$ dosages (0.1 g/L and 1.0 g/L) were tested for varied water matrix and under different irradiance conditions.

Figure 9:
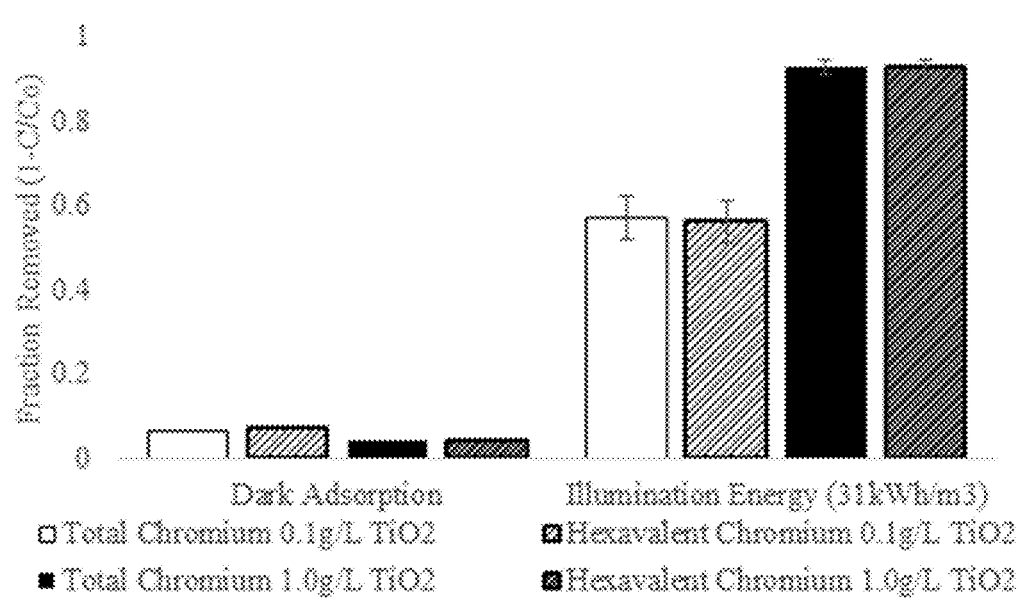
FIG. 9 shows removal efficiencies for hexavalent and total chromium in dechlorinated tap water with initial Cr(VI) concentration of 500 µg/L. The Y-axis represents calculated removal of either hexavalent (striped) or total chromium (solid), while the x axis represents the energy input. Dark adsorption represents runtime of one hour without illumination. Illumination data sets utilize removal values normalized to an equivalent energy input (31 kWh/m$^3$) with error bars (n=½).

In recirculation experiments, hexavalent and total chromium concentrations decreased simultaneously for a dechlorinated tap water matrix spiked with different initial Cr(VI) concentrations. This indicates both hexavalent and total chromium were removed from the aqueous solution (FIG. 9). For inputs of 1 g/L $TiO_2$, chromium removals varied between 89% and 98% for initial concentrations of 500 ppb Cr(VI). Only 4% of Cr(VI) absorbed onto $TiO_2$ in the dark. Therefore, Cr(VI) removals above 4% are attributable to photocatalytic processes. With only 0.1 g/L $TiO_2$ added and 100 ppb Cr(VI), removals varied from 45% to 70% with around 6.5% dark adsorption. The change in Cr(VI) concentration equaled the removal of total chromium in the system indicating sorption of chromium species onto titanium (discussed below). EE/O for tap water was substantially higher than ultrapure water.

Figure 10:
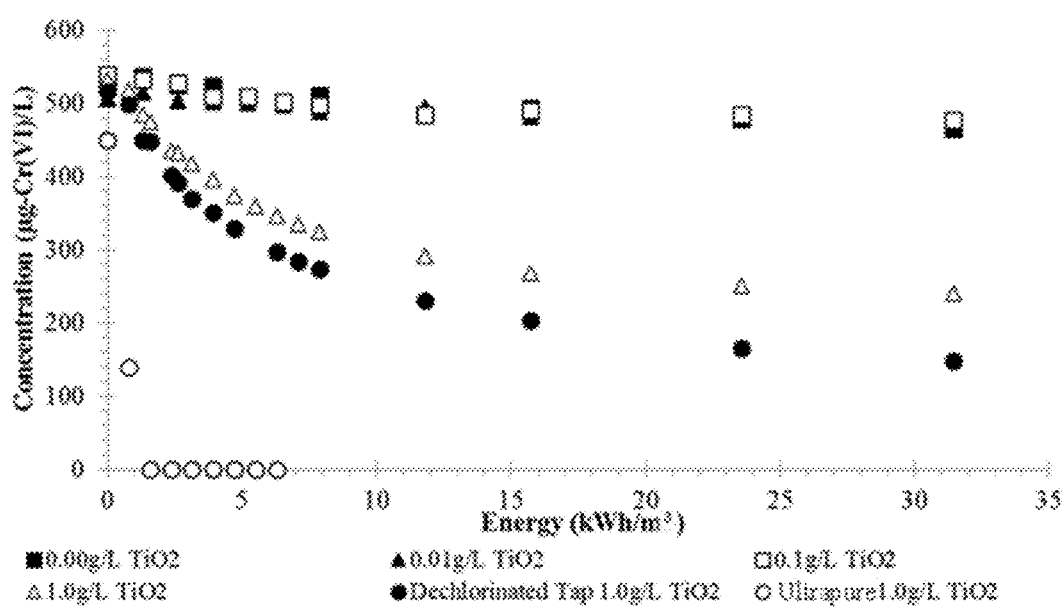
FIG. 10 shows effluent chromium concentrations based on initial input P90 dosage. Initial concentrations were 500 µg/L Cr(VI) with added 0.0 g/L, 0.01 g/L, 0.1 g/L, 1.0 g/L added P90 titanium dioxide. Experiments above were conducted using buffered deionized water (5 mM NaHCO$_3$, pH 8.5 to 8.7, *), unless otherwise noted in the legend. pH for dechlorinated tap matrix ranged from 7.7 to 7.9 from $C_{in}$ (at t=0) to $C_f$ (final sampling); pH for ultrapure ranged from 6.5-7.1. Temperature was controlled to remain between 25° C. and 30° C. for all experiments.
Figure 11:
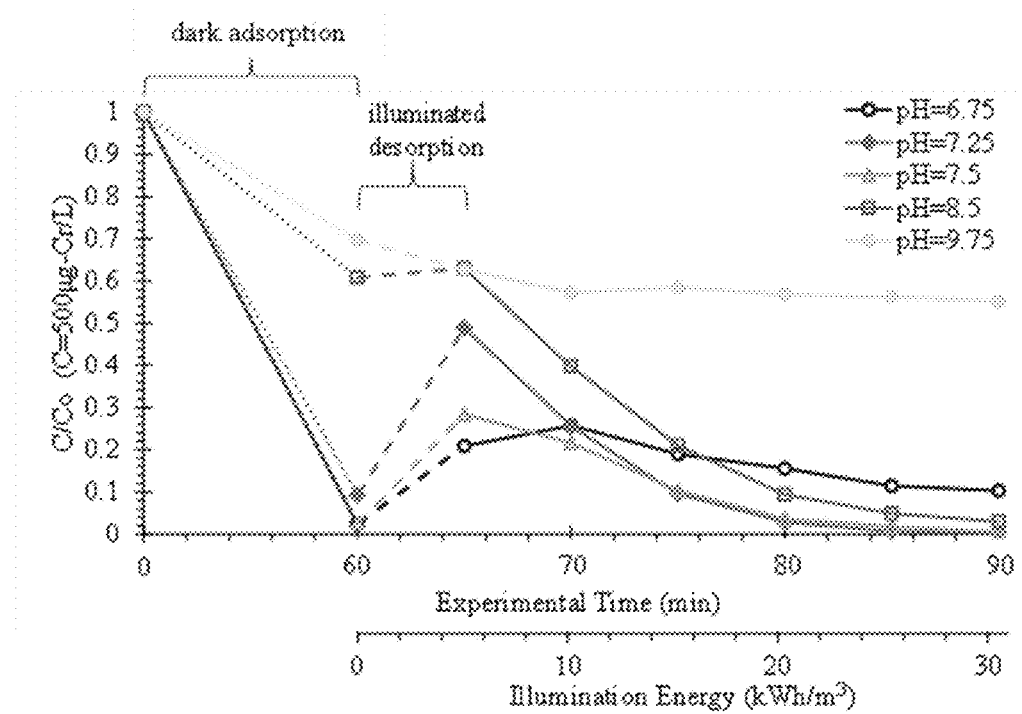
FIG. 11 shows a comparison of chromium removal at varied pH for a deionized matrix. Initial Cr(VI) concentration (Co) was 500 µg Cr(VI)/L. pH was varied using aliquots of KOH solution and equilibrated before irradiation for 60 minutes as shown. Secondary x-axis corresponds to the illumination energy upon irradiation (beginning at t=60 min).

The impact of water matrix was assessed between 18.3 MΩ/cm$^3$ nanopure water, buffered deionized water (5 mM $NaHCO_3$), pH-mediated deionized water with KOH, or dechlorinated tap water. In ultrapure water with only Cr(VI) salts, near complete Cr(VI) reduction occurred with 2 kWh/m$^3$ of energy input (FIGS. 7 and 10). In 5 mM $NaHCO_3$ buffered deionized water, $TiO_2$ dosages below 1 g$TiO_2$/L achieved less than 20% Cr(VI) removal, regardless of energy input. A 1 g/L dose of $TiO_2$ achieved 50% reduction of 500 ppb Cr(VI) at 10 kWh/m$^3$. Dechlorinated tap water exhibited slightly more effective Cr(VI) reduction than 5 mM $NaHCO_3$ buffered deionized water, with removal ranging up to 62% at a 1 g/L $TiO_2$ dose. Because 5 mM $NaHCO_3$ increases pH almost one unit, which creates less thermodynamically favorable conditions for Cr(VI) reduction, further experiments were completed using deionized water without a buffer at varied pH (FIG. 11). A significant dark adsorption of chromium ($CrO_4^{2-}$, $pK_a$=0.6 and 5.9 from Brito et al. ("Equilibria of chromate (VI) species in acid medium and ab initio studies of these species", Polyhedron, 16(21), 3835-3846) occurred when the solution pH was within ±1.5 pH units of $pH_{zpc}$ for $TiO_2$ ($pH_{zpc}$=6.2). Desorption occurred upon initial irradiation followed by reduction and removal upon further irradiation. When the solution was at pH>7.8 (pH>1.5+$pH_{zpc}$), less dark adsorption of chromium species was observed. With multivalent cations (i.e., Cr(III)), small changes in pH can lead to relatively large changes in sorption capacity.

Analyses conducted on slurry effluent samples taken after dechlorinated tap experiments showed accumulation of Cr on the $TiO_2$ solid surface. While virgin P90 is a pure white, the dried titanium samples from experiments were mint green, an indicator of chromium species on the surface of the titanium dioxide. SEM was conducted on both virgin P90 and a Photo-Cat® slurry effluent from a dechlorinated tap water experiment series of 1 g/L P90 and 500 ppb Cr(VI) to determine presence and quantity of chromium on the surface (FIG. 12). For the case of virgin P90, SEM showed only Ti and O present at the surface, with a carbon response from the stub on which the P90 was mounted. SEM-EDX analysis on spent $TiO_2$ indicated chromium in addition to a number of common tap water constituents (based on EDX: Na>Cl>Mg>Cr>S>Ca>K) on the $TiO_2$. SEM of $TiO_2$ after flow through experiments revealed a doubling in $TiO_2$ particles' size compared to batch mode but with comparable distribution of elements on the catalyst surface. Though chromium represented a relatively low atomic weight percentage of surface coverage (0.17%), detection shows that it was present and attached to the surface in some manner.

Figure 13:
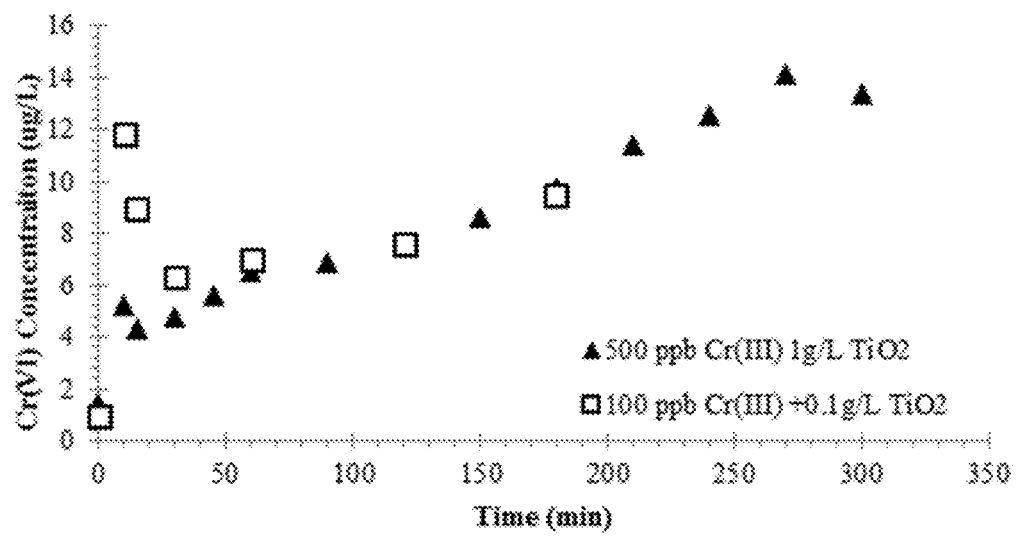
FIG. 13 shows evolution of Cr(VI) from starting concentration of only Cr(III) in dechlorinated tap water. The pH increased over the course of the experiment (7.5 to 7.75 and 7.85 to 7.95 for 1.0 g/L $TiO_2$ and 0.1 g/L $TiO_2$, respectively).
Figure 14:
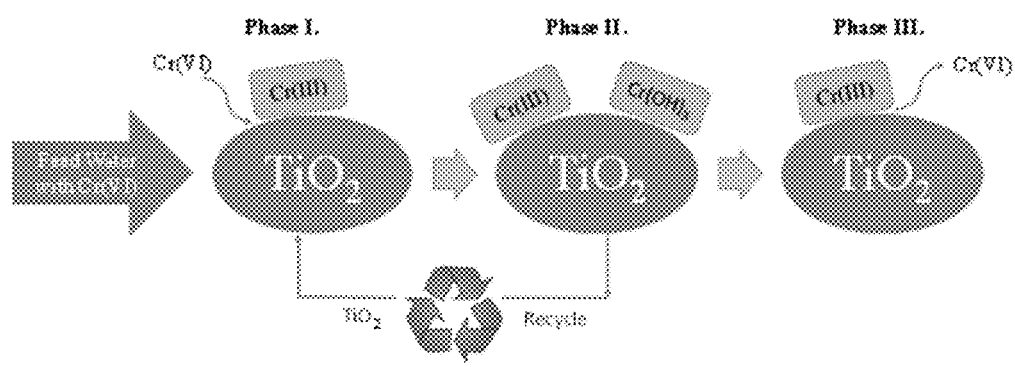
FIG. 14 depicts mechanisms involved in the reduction of hexavalent chromium and removal from aqueous solution of total chromium species via reduction and sorption processes. Boxed items represent sorbed species. The phases indicated represent: I. Cr(VI) reduction to Cr(III) and sorption to $TiO_2$ surface; II. Cr(III) stability on the surface and opportunity to recycle titanium and remove chromium species using acid rinse; III. Cr(III) oxidation and desorption upon additional irradiation.

FIG. 9 shows that in a recirculation operation, a steady state concentration of Cr(VI) and an equal concentration of soluble $Cr_{total}$ (total chromium) occurs in solution. After Cr(VI) concentrations in the ceramic membrane permeate water decreased to below detection levels, continued and prolonged UV irradiation may reform Cr(VI). This likely occurred as a surface-bound Cr(III) was oxidized to Cr(VI). Cr(VI) reformation potential was investigated using an initial input of Cr(III) with 0.1 g/L P90 at 100 ppb initially available Cr(III) and 1.0 g/L P90 at 500 ppb initially available Cr(III). FIG. 13 shows that in both cases, Cr(VI) evolved from the Cr(III) initial solution. Less than 10% of the Cr(III) became soluble in solution as Cr(VI) at 0.1 g $TiO_2$/L, with even less at the 10× higher $TiO_2$ dose (5× higher Cr(III) dose). This may be due to both the high sorption of Cr(III) to $TiO_2$ and precipitation of $Cr(OH)_{3(s)}$ at neutral pH. The conceptual model presented articulates the sorption-desorption-reduction cycle (FIG. 14) with recommendation of a mid-process recycle for the spent $TiO_2$.

Figure 12A:
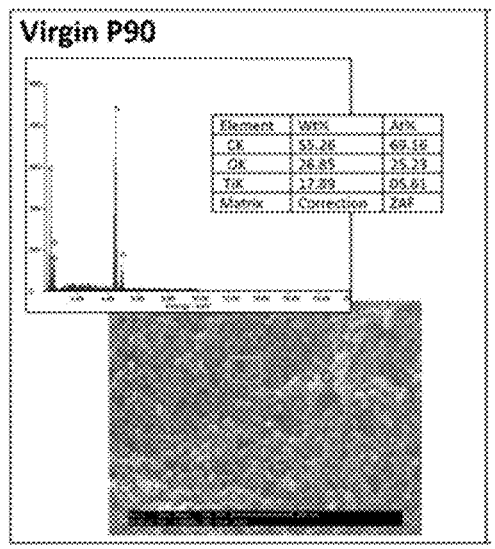
FIG. 12A shows an SEM image of virgin P90.
Figure 12B:
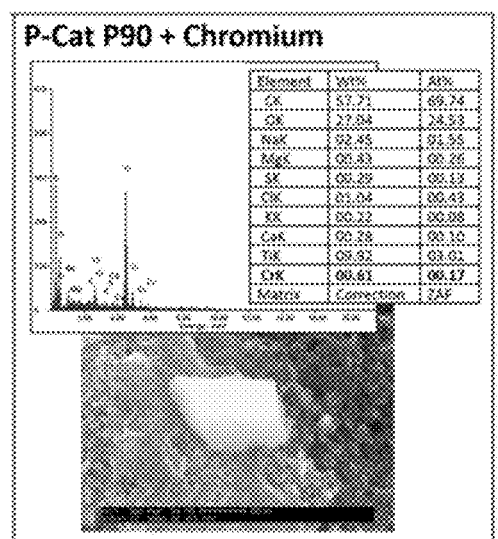
FIG. 12B shows an SEM image of P90 run in Photocat® with 500 µg-Cr/L and 1 g-P90/L.

Separate experiments were performed in flow through operation using a feed of dechlorinated tap water (pH~7.5) spiked with either 10 or 100 ppb Cr(VI). The steady state flow rate through the system was 2.1 Lpm. Lamps were operated at full power in the presence of 1 g/L $TiO_2$ which was captured by the ceramic membrane, recirculated and mixed with feed water. For 10 and 100 ppb influent Cr(VI), effluent measurements of Cr(VI) and $Cr_{total}$ were equal and averaged 9.4±0.7 μg-Cr/L and 79.8±1.8 μg-Cr/L after 30 minutes, respectively. These experiments suggest either poor photocatalytic reduction of Cr(VI) in the tap water or steady state removal and reformation. Poor photocatalytic reduction is suspected because evaluation of spent $TiO_2$ indicated significant aggregation of the media, which would reduce light exposed surfaces and potentially reduce ability for Cr(VI) to directly contact the $TiO_2$. FIGS. 12A and 12B show SEM images of virgin $TiO_2$ and spent media from continuous flow tap water experiments. EDX analysis of the latter media indicated that the presence of Na, Cl, Mg, Cr, S, Ca, K. In contrast to a limited concentration of natural water foulants in batch experiments with tap water, continuous loading of foulants from tap water appears to have caused $TiO_2$ to aggregate and be reduced in efficiency. Fouling of $TiO_2$ has been suggested to reduce its effectiveness in the Photo-Cat® system when applied over long term operation oxidizing trace organics in reclaimed wastewater (Gerrity et al., "Photocatalytic inactivation of viruses using titanium dioxide nanoparticles and low-pressure UV light", *Journal of environmental science and health. Part A, Toxic/hazardous substances & environmental engineering*, 43(11), 1261-70).

Figure 15:
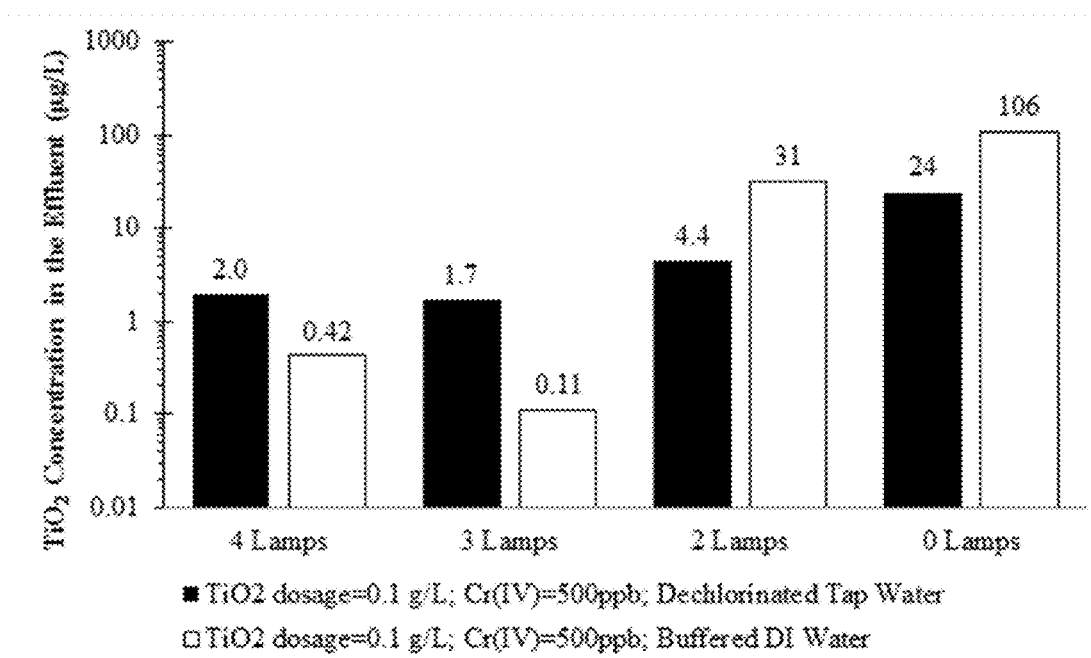
FIG. 15 shows titanium dioxide concentration in membrane permeate samples taken at t=15 min as a function of lamps and water matrix. pH for 5 mM $NaHCO_3$ buffered DI matrix ranged from 8.5 to 8.7 from $C_{in}$ to $C_f$; pH for dechlorinated tap ranged from 7.7 to 7.9.

Potential passage of $TiO_2$ across the ceramic membrane into the treated water was investigated. FIG. 15 shows the concentration of $TiO_2$ in the ceramic membrane permeate for 0.1 g/L $TiO_2$ in 5 mM $NaHCO_3$ deionized water as well as in dechlorinated tap water; all samples were taken at a run-time of 15 minutes and analyzed by spICP-MS. The permeate concentrations depended upon water matrix and illumination (3-4 lamps operating). Without illumination, $TiO_2$ was poorly recovered by the ceramic membrane. Increasing irradiation levels significantly improved $TiO_2$ recovery, indicating "photo-aggregation" of the $TiO_2$. Without illumination of tap water, 24% of the $TiO_2$ passed the ceramic membrane. With any level of illumination in tap water, <5% of the $TiO_2$ passed the membrane. Tap water contains roughly 5 μg/L of Ti, but the spICP-MS mode clearly indicated $TiO_2$ particles in the membrane permeate that were not present in the initial tap water, i.e., above the background concentration. Primary particle size of well-dispersed P90 ranges from 12-18 nm, whereas ultrafiltration membranes range from 0.1 to 0.001 μm, or 1 to 100 nm, indicating that some pores may be larger than the individual particles leading to penetration. Reasons for observed variations in leaching may be $TiO_2$ aggregation patterns upon illumination, pH and ionic strength differences of the water matrix or decreased ability to pass the ultrafiltration membrane upon higher chromium surface loading onto $TiO_2$ and thus, increased size of $TiO_2$ particles.

The removal capacity of hexavalent chromium was investigated under varied water matrix, titanium dioxide dosage, and energy input using an engineering-scale photocatalytic reactor system. The integrated UV-$TiO_2$-ceramic membrane system feasibly reduces Cr(VI) and removes all aqueous chromium species. Catalyst dosage was the most impactful quality investigated, with the most successful dosage of 1 $gTiO_2$/L. Higher alkalinity, pH, or presence of divalent salts decreased the effectiveness of Cr(VI) reduction on $TiO_2$ (i.e., higher EE/O requirements). The presence of divalent cations in the tap water likely aggregated the $TiO_2$. P90 has primary particle sizes of 12-18 nm, which are on the same size or smaller than some ultrafiltration membrane pore diameters. Agglomeration of the initial media or aggregation of $TiO_2$ during use increases its size, making passage through the membrane less favorable. This phenomena may occur as the catalyst produces electrons and holes on the $TiO_2$ surface during illumination, thus changing the local surface charges and allowing aggregation to occur. Additional research is needed to understand this photoaggregation process alone as well as on the role of divalent salts and the role of $TiO_2$ photoaggregation on this advanced photo-oxidation processes (AOP).

Surface analysis confirmed chromium species are on the surface of the $TiO_2$ in the effluent slurry and significant aggregation of $TiO_2$ particles when in flow-through mode. As Cr or inorganic foulants accumulate on $TiO_2$, its effectiveness is reduced. The spent $TiO_2$ may be recovered, the media acid washed to remove Cr(III) species and foulants, the $TiO_2$ reused based upon full-scale implementation data. While Cr(VI) photocatalytic reduction occurs readily in ultrapure water at low irradiance levels, the presence of salts, alkalinity, and elevated pH levels increase energy requirements. Thus, photocatalytic reduction of Cr(VI) can be achieved in complex water matrices after managing aggregation and foulants.

A number of embodiments have been described. Nevertheless, it will be understood that various modifications may be made without departing from the spirit and scope of the disclosure. Accordingly, other embodiments are within the scope of the following claims.

What is claimed is:
1. A water treatment system comprising:
   a flow regulation control system configured to combine oxo-anion-contaminated water with at least one of a reduction-promoting agent and a hole scavenger;
   a reactor fluidically coupled to the flow regulation control system, the reactor comprising a photocatalyst, wherein the oxo-anion-contaminated water is treated in the reactor to yield a treated effluent;
   a first set of system control probes positioned upstream of the flow regulation control system and configured to monitor the concentration of oxygen and oxo-anion reduction products in the oxo-anion-contaminated water;
   a second set of system control probes positioned downstream of the reactor and configured to monitor concentration of the oxo-anion and oxo-anion reduction products in treated effluent from the reactor; and
   a controller configured to control the flow regulation control system, thereby controlling the flow rate of the oxo-anion-contaminated water and the at least one of the reduction-promoting agent and the hole scavenger to the reactor based at least in part on the concentration of oxo-anion and reduction productions of the oxo-anion in the treated effluent from the reactor.

2. The water treatment system of claim 1, further comprising a pretreatment unit fluidically coupled to and upstream of the flow regulation control system, wherein the pretreatment unit is configured to remove organic matter from the oxo-anion-contaminated water.

3. The water treatment system of claim 2, wherein the pretreatment unit is configured to remove silica, phosphate, sulfate, iron, arsenate, calcium, or a combination thereof from the oxo-anion-contaminated water.

4. The water treatment system of claim 1, wherein the second set of system control probes monitors at least one of pH and temperature in the treated effluent from the reactor.

5. The water treatment system of claim 1, wherein the flow regulation control system comprises valves, and the valves are controlled by the controller.

6. The water treatment system of claim 1, wherein the controller controls the residence time of the oxo-anion-contaminated water and at least one of the reduction-promoting agent and the hole scavenger in the flow regulation control system.

7. The water treatment system of claim 1, wherein the reactor comprises a light source.

8. The water treatment system of claim 7, wherein the light source is selected from the group consisting of a UV light source, a visible light source, a xenon lamp, and a mercury lamp.

9. The water treatment system of claim 7, wherein the controller controls the intensity of the light source.

10. The water treatment system of claim 1, wherein the photocatalyst is immobilized on a UV/visible light-conducting surface.

11. The water treatment system of claim 1, wherein the photocatalyst is suspended in the oxo-anion-contaminated water in the reactor.

12. The water treatment system of claim 1, further comprising a photocatalyst recovery system fluidically coupled to the reactor.

13. The water treatment system of claim 12, wherein the photocatalyst recovery system comprises a microfiltration unit or an ultrafiltration unit.

14. The water treatment system of claim 1, wherein the photocatalyst comprises a catalyst that, upon photon excitation, generates electrons and holes with redox potentials capable of reducing the oxo-anion and its products and oxidizing the hole scavenger, respectively.

15. The water treatment system of claim 1, wherein the oxo-anion is nitrate, and the photocatalyst catalyzes the reduction of nitrate to nitrogen gas and ammonium ions.

16. The water treatment system of claim 1, wherein the reduction-promoting agent reacts on the photocatalyst to limit recombination of photo-excited electrons.

17. The water treatment system of claim 1, wherein the reduction-promoting agent improves the interaction between the oxo-anion, its reduction products, or both with the photocatalyst.

18. The water treatment system of claim 1, wherein the hole scavenger provides an electron with a redox potential sufficient to fill a hole generated in the photocatalyst upon excitation.

19. The water treatment system of claim 17, wherein the hole scavenger is formic acid, sodium formate, or a combination thereof.

20. The water treatment system of claim 1, wherein the oxo-anion comprises nitrate, chromate, or a combination thereof.

21. A method of removing oxo-anion from oxo-anion-contaminated water, the method comprising:
providing a water treatment system comprising:
a flow regulation control system configured to combine oxo-anion-contaminated water with at least one of a reduction-promoting agent and a hole scavenger;
a reactor fluidically coupled to the flow regulation control system, the reactor comprising a photocatalyst;
a first set of system control probes positioned upstream of the flow regulation control system and configured to monitor the concentration of oxygen and oxo-anion reduction products in the oxo-anion-contaminated water;
a second set of system control probes positioned downstream of the reactor and configured to monitor concentration of the oxo-anion and oxo-anion reduction products in treated effluent from the reactor; and
a controller configured to control the flow regulation control system, thereby controlling the flow rate of the oxo-anion-contaminated water and the at least one reduction-promoting agent and the hole scavenger to the reactor based at least in part on the concentration of oxo-anion and reduction products of the oxo-anion in the treated effluent from the reactor;
flowing the oxo-anion contaminated water and at least one of the reduction-promoting agent and the hole scavenger in the water treatment system to yield a mixture;
providing the mixture to the reactor; and
photocatalytically reducing the oxo-anion in the mixture within the reactor to yield the treated effluent, wherein the flow rate of the oxo-anion-contaminated water and at least one of the reduction promoting agent and the hole scavenger is automatically controlled by the controller based at least in part on the concentration of oxo-anion and reduction products of the oxo-anion in the treated effluent.

22. The method of claim 21, further comprising homogenizing the mixture and removing oxidants from the mixture before providing the mixture to the reactor.

23. The method of claim 21, wherein the oxo-anion is nitrate, and photocatalytically reducing the nitrate in the nitrate-contaminated water yields nitrogen gas and ammonia.

24. The method of claim 23, wherein an intensity of light in the reactor during the photocatalytic reduction is automatically controlled based at least in part on the concentration of oxo-anion and reduction products of the oxo-anion in the treated effluent.

25. The method of claim 21, wherein the oxo-anion comprises nitrate, chromate, or a combination thereof.

* * * * *